US008428214B2

(12) United States Patent
Ketcham et al.

(10) Patent No.: US 8,428,214 B2
(45) Date of Patent: Apr. 23, 2013

(54) METHOD FOR ALIGNING AND HANDLING FUEL RODS WITHIN A NUCLEAR FUEL BUNDLE

(75) Inventors: David P. Ketcham, Charlotte, NC (US); Vernon John Fullerton, Supply, NC (US); David Grey Smith, Leland, NC (US); Rex Gormen Robinson, Richland, WA (US); Gerald A. Luciano, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 13/280,936

(22) Filed: Oct. 25, 2011

(65) Prior Publication Data

US 2012/0039428 A1    Feb. 16, 2012

Related U.S. Application Data

(62) Division of application No. 12/786,879, filed on May 25, 2010, now Pat. No. 8,050,378, which is a division of application No. 11/711,614, filed on Feb. 28, 2007, now Pat. No. 7,773,717.

(51) Int. Cl.
*G21C 19/00* (2006.01)

(52) U.S. Cl.
USPC ........... 376/264; 376/269; 376/270; 376/271; 376/245

(58) Field of Classification Search .................. 376/261, 376/264, 268, 269–271, 245
See application file for complete search history.

(56) References Cited

U.S. PATENT DOCUMENTS

| 4,428,903 | A | 1/1984 | Kasik et al. |
| 4,637,912 | A | 1/1987 | Scharpenberg et al. |
| 4,673,545 | A | 6/1987 | Cooke et al. |
| 4,724,636 | A | 2/1988 | Tolino |
| 4,966,745 | A | 10/1990 | Widener et al. |
| 5,017,332 | A | 5/1991 | Dix et al. |
| 5,425,070 | A * | 6/1995 | Gosnell et al. ............... 376/260 |
| 6,487,266 | B1 | 11/2002 | Dix et al. |
| 7,728,903 | B2 | 6/2010 | Ohnishi |

* cited by examiner

*Primary Examiner* — Timothy A Brainard
(74) *Attorney, Agent, or Firm* — Harness, Dickey & Pierce, P.L.C.

(57) ABSTRACT

A method of aligning a nuclear fuel bundle and handling selected fuel rods within the fuel bundle located in a spent fuel pool of a nuclear power plant. The bundle includes water rods, full-length and part-length fuel rods extending through a plurality of fuel spacers provided between top and bottom ends of the bundle, each spacer having a plurality of cells accommodating corresponding fuel and water rods. The method includes insertion of a rod grapple tool into a top end of a fuel bundle and down to a desired location within the bundle. A guide pin retrieval tool inserts into a side of the fuel bundle to remove a guide pin from a distal end of a gripper of the rod grapple tool, allowing the guide pin retrieval tool to grip a part-length fuel rod within the fuel bundle.

8 Claims, 21 Drawing Sheets

FIG. 2A
FIG. 2B
FIG. 2C
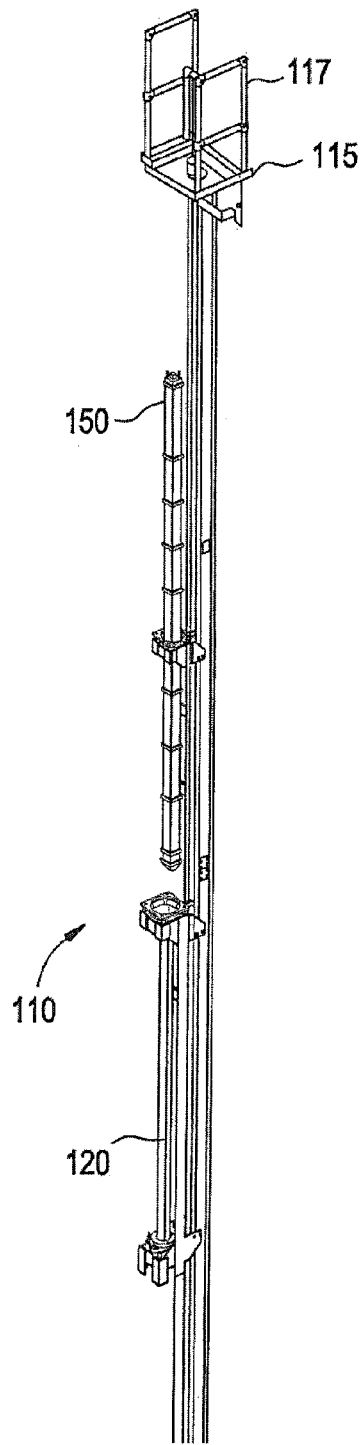
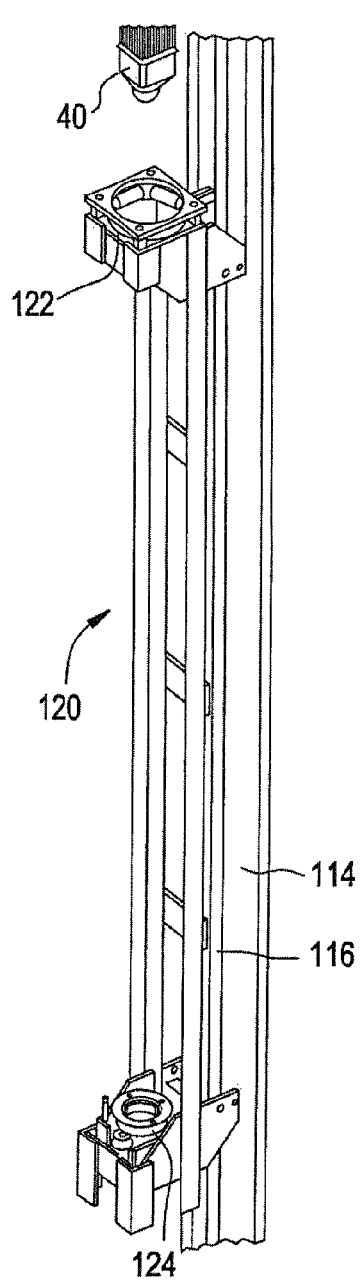
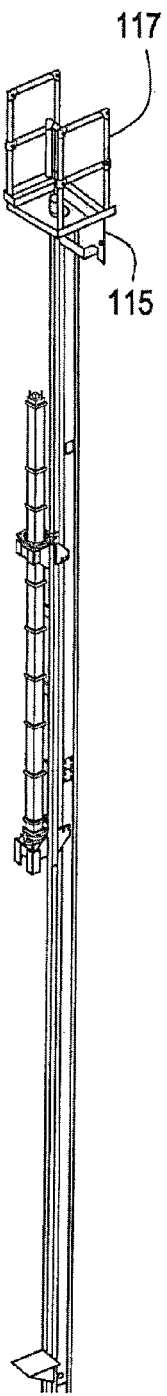

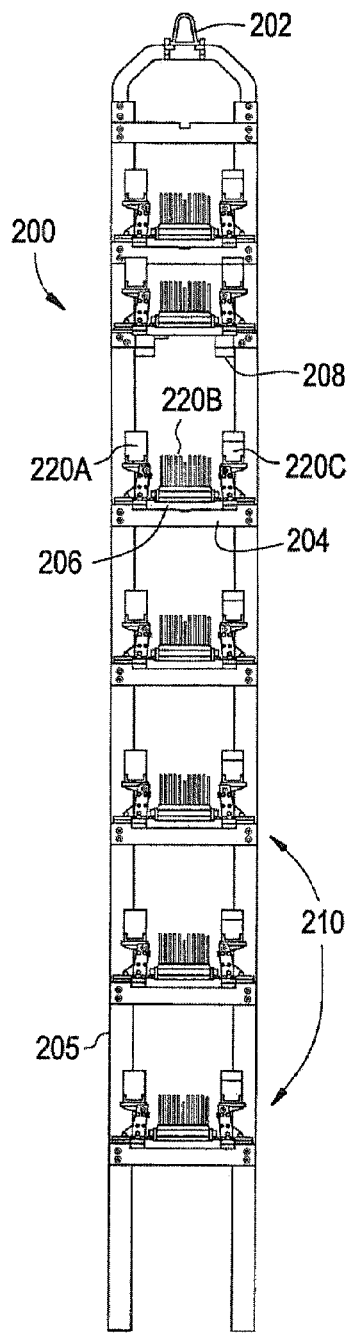
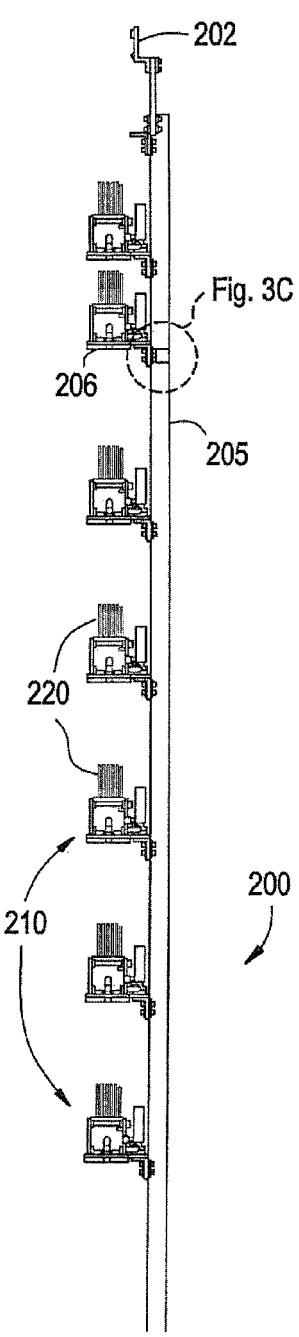
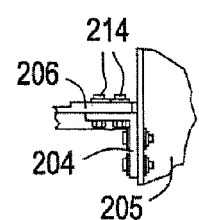

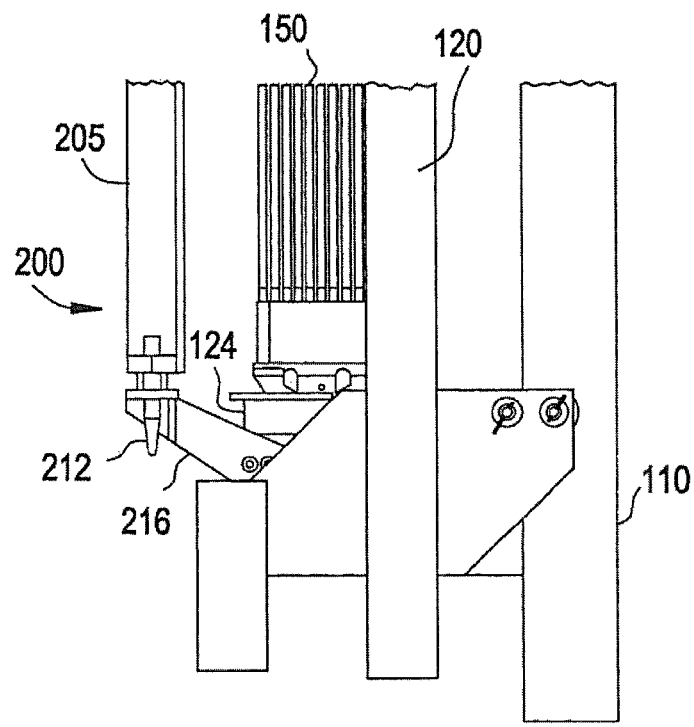
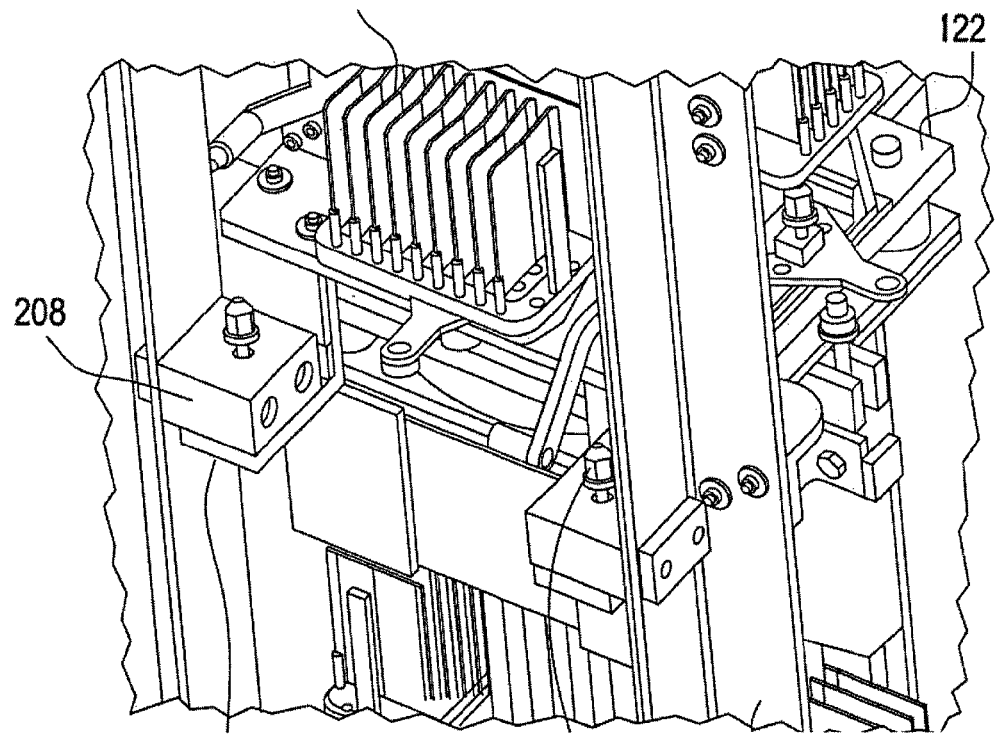

FIG. 15A
FIG. 15B
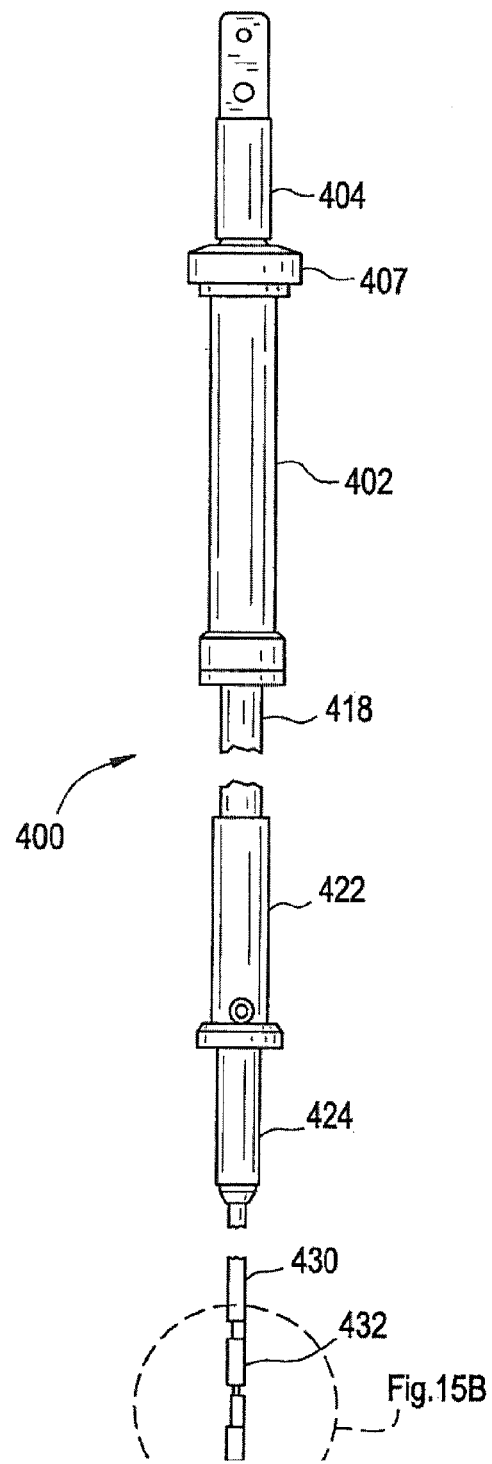
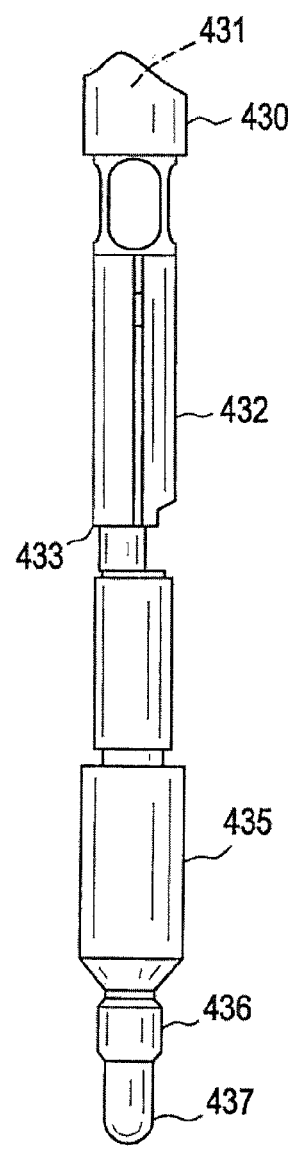

FIG. 17A
FIG. 17B
FIG. 18
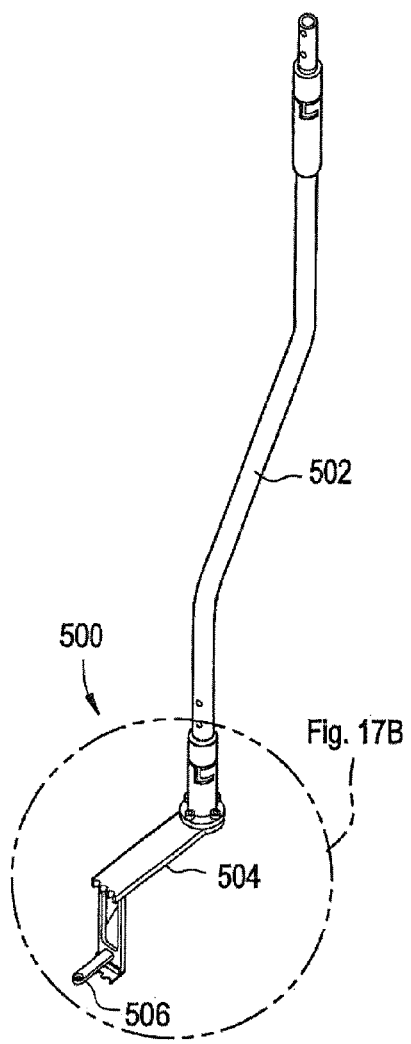
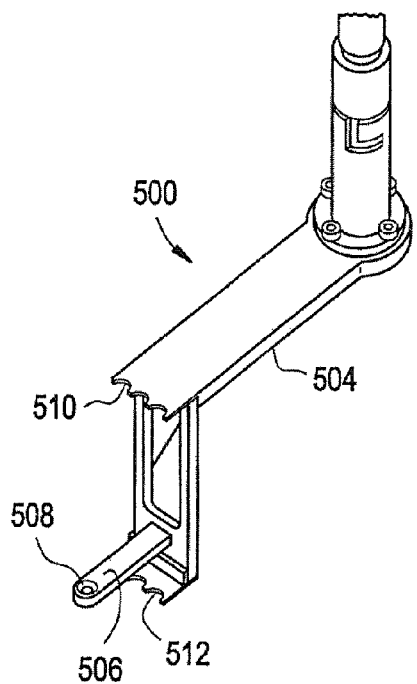
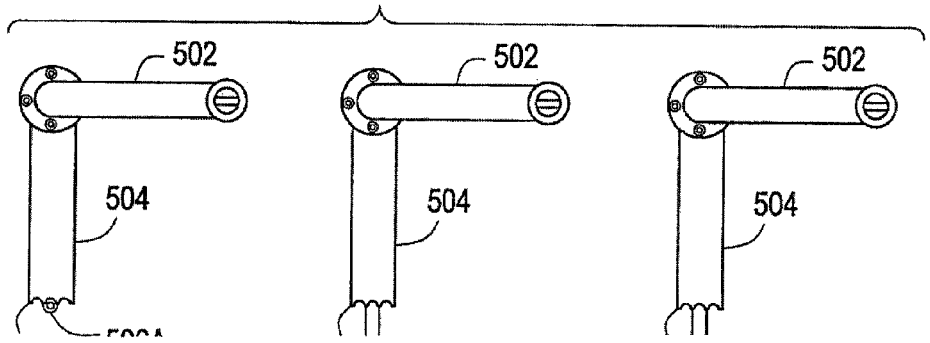

FIG. 19
FIG. 20
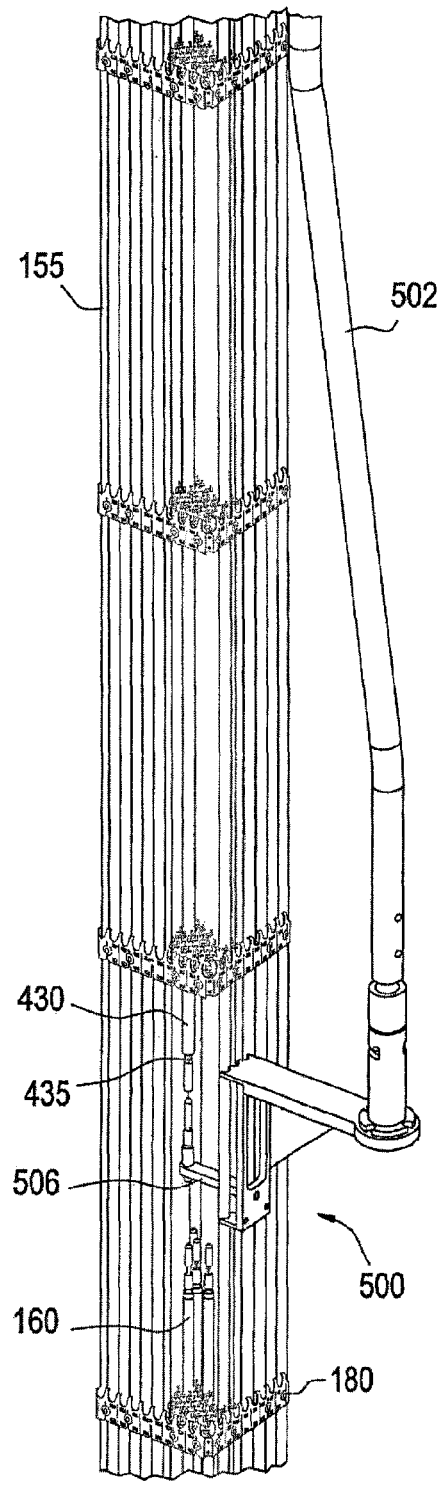
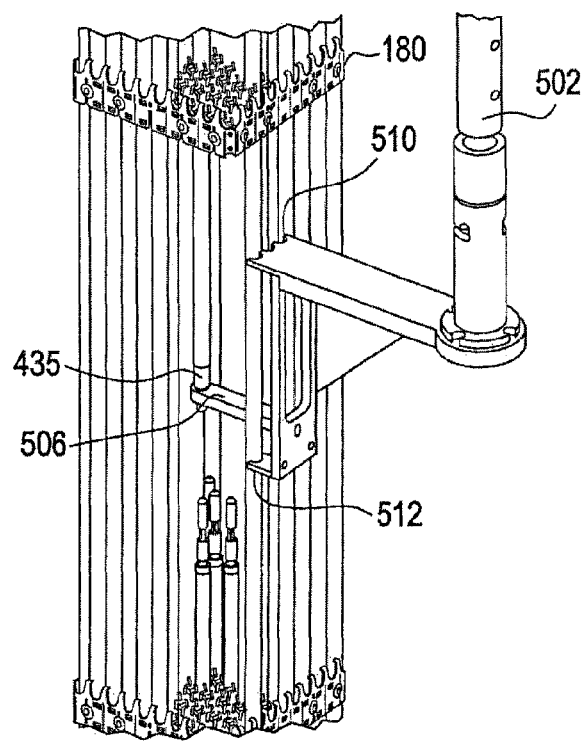

FIG. 24A
(CONVENTIONAL ART)
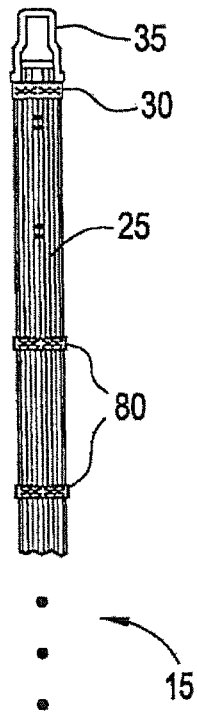
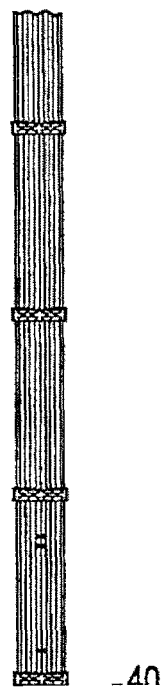
FIG. 24B
(CONVENTIONAL ART)
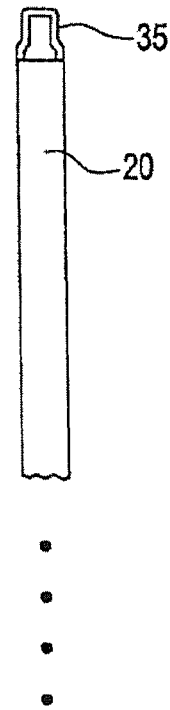
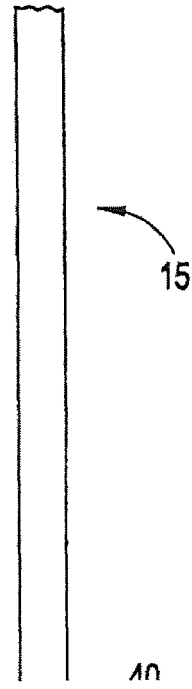

METHOD FOR ALIGNING AND HANDLING FUEL RODS WITHIN A NUCLEAR FUEL BUNDLE

BACKGROUND OF THE INVENTION

This application is a divisional of U.S. patent application Ser. No. 12/786,879, filed on May 25, 2010 now U.S. Pat. No. 8,050,378, which is a divisional of U.S. patent application Ser. No. 11/711,614, filed on Feb. 28, 2007 now U.S. Pat. No. 7,773,717, the contents of both of which are incorporated by reference in their entirety.

FIELD OF THE INVENTION

Example embodiment(s) are related in general to systems for aligning and handling fuel rods and water rods within a nuclear fuel bundle.

DESCRIPTION OF THE RELATED ART

A reactor core of a nuclear reactor plant such as boiling water reactor (BWR) or pressurized water reactor (PWR) has several hundred individual fuel bundles of fuel rods (BWR) or groups of fuel rods (PWR). During a planned plant outage for the BWR, selected irradiated fuel bundles are removed from the reactor core at the nuclear power plant and placed in a spent fuel pool for inspection and possible reconstitution of the bundle and/or maintenance. For example, there may be leaking fuel bundle which necessitates removing the irradiated fuel bundle from the core, as it is desirable to service these bundles in the event of a broken fuel rod and/or damaged fuel spacer grid which may be causing the leak. Additionally, when the fuel bundle is removed from the core and placed in the spent fuel pool, it is desirable to manipulate the fuel bundle for inspection purposes in order to search for additional possible sources of damage or leaks, and/or to rotate the bundle for general maintenance and measurement.

A typical fuel bundle for a BWR includes a plurality of fuel rods and centrally located water rods attached between an upper tie plate and a lower tie plate. For example, in FIG. 24A, there is shown a fuel bundle 15 for a BWR which includes a plurality of fuel rods 25 and one or more water rods (water rods obscured and which may or may not be centrally located within bundle 15), connected between an upper tie plate 30 and a lower tie plate 40.

FIG. 24B shows the same fuel bundle 15 as it would look upon removal from the core and prior to removal of the channel 20 for inspection and maintenance. The bundle 15 includes a generally rectangular channel 20 which extends the length of fuel bundle 15 and surrounds the fuel rods, water rods and upper and lower tie plates 30, 40. The channel 20 is an extruded alloy which encases the bundle 15. The fuel bundle 15 is typically delivered into the spent fuel pool via a fuel handling bridge (not shown) which is permanent machinery in reactor plants. The fuel handling bridge attaches to the upper tie plate bail (handle) 35 of the fuel bundle 15 to move the fuel bundle 15 from the core to the spent fuel pool.

Typically the fuel bundle 15 shown in FIG. 24B is centered over a fuel prep machine (FPM-not shown), and a carriage of the FPM is raised to receive the fuel bundle 15. As is well known in the art, the FPM is attached to a wall of the spent fuel pool in a nuclear power plant. Once the channeled fueled bundle 15 is place within the FPM, the channel 20 and upper tie plate 30 are removed to expose the fuel rods 25 and the fuel bundle 15 upper end for inspection and/or maintenance purposes.

Of note, with continued power operations of the reactor core with the irradiated fuel bundle 15, the fuel bundle 15 can be subjected to bow or twist. Twist/bow is caused by the amount of time the fuel bundle 15 has been in-service. In other words, the more the bundle 15 is used in an operating reactor core (i.e., the greater the exposure of the bundle in megawatt-days per short time (MWD/st), the greater the twist/bow potential. Accordingly, if the bundle 15 in the FPM exhibits twist or bow, it becomes substantially more difficult to remove selected fuel rods 25 in order to service/inspect the fuel bundle 15.

A fuel bundle exhibits twist and bow due to the growth of individual fuel rods over time and exposure within the core. In an example, a fuel bundle for a BWR is typically held together with a plurality of tie rods. The lower end plugs of the fuel rod screw into the lower tie plate 40, and the upper tie plate 30 slides in place over the fuel rods 25, water rods and tie rods. The upper end plug of the tie rods are threaded and receive nuts which secures the fuel bundle 15 together.

As the fuel rods 25 grow due to irradiation, the fuel rods 25 have little room to expand as they are sandwiched between the upper tie plate (UTP) 30 and lower tie plate (LTP) 40. The fuel rods do not all grow exactly the same amount, resulting in an uneven growth; this causes portions of the fuel bundle 15 to lengthen more than other areas within the bundle 15, producing what's known as bow and twist.

Most fuel bundle designs in BWRs (such as the fuel bundle 15) and PWRs include a plurality of fuel spacers 80, also referred to as spacer grids, which are axially spaced along the length of the fuel bundle 15. A typical fuel spacer 80 or spacer grid includes a plurality of cells or openings which accommodate the fuel rods and water rods there through. These fuel spacers 80 are generally not robust in construction, and can be damaged during routine in-service fuel inspections while removing and installing full and part-length fuel rods and water rods in the bundle within the spent fuel pool. The damage caused to the fuel spacers 80 could go unnoticed, and could cause additional damage to individual fuel rods 25 if a reconstituted fuel bundle (such as fuel bundle 15) is returned to power operations within the core. Accordingly, during removal and installation of the fuel rods 25 in a given irradiated fuel bundle 15 within the spent fuel pool, there is a substantial probability for fuel bundle component damage, either to the fuel rod itself, the spacers, the water rods or end plugs of fuel rods, which can occur during the in-service maintenance of the fuel rods within the spent fuel pool.

Further, as the removed fuel bundle 15 within the spent fuel pool is completely submerged, most inspections are done remotely and maintenance or repair is done by operators standing well above the fuel bundle 15, while utilizing a remote camera system and length handling poles with implements at ends thereof. The handling poles are inserted down through the fuel bundle 15 to remove/install selected fuel rods.

With the upper tie plate 30, the channel clip (not shown) and the channel 20 removed, workers typically utilize up to a 30-foot handling pole to perform maintenance, installation and/or removal of fuel rods 25. Particularly in the case of part-length fuel rods, which in some case are substantially shorter than full-length fuel rods, only the skill and experience of the handler of the handling pole ensures that a part-length rod can be safely extracted (or installed) without causing damage to the fuel spacers 80 or adjacent fuel rods 25. This is true even with the use of remote cameras positioned down in the spent fuel pool for monitoring the maintenance procedure.

Accordingly, conventional procedures for retrieving/installing a part-length fuel rod are time consuming if not impossible, cumbersome and must rely on the experience and skill of the operator manipulating the handling pole to avoid damaging a fuel spacer 80 or adjacent fuel rod 25. As fuel bundle designs are becoming even more complex, this inadvertent damage to the fuel spacers 80 and/or fuel rods 25 is even more likely without an adequate alignment and handling system.

BRIEF DESCRIPTION OF THE INVENTION

An example embodiment is directed to a system in a nuclear power plant for aligning a nuclear fuel bundle and handling selected fuel rods and/or water rods within the fuel bundle, where the fuel bundle resides in a spent fuel pool within the plant. The fuel bundle includes one or more water rods and a plurality of fuel rods including full-length fuel rods and part-length fuel rods extending vertically within the bundle through a plurality of axially spaced fuel spacers provided between a top end and bottom end of the fuel bundle, each fuel spacer including a plurality of individual cells accommodating corresponding fuel rods and water rods. The system includes a fuel prep machine (FPM) in the spent fuel pool for supporting the fuel bundle thereon, a bundle alignment assembly attached to the fuel prep machine for aligning fuel rods within the fuel bundle to remove any twist or bow within the fuel bundle, a rod grapple tool to extract selected part-length rods from the fuel bundle, and a fuel rod guide block slidable onto the top end of the fuel bundle for protecting an uppermost fuel spacer of the fuel bundle and aligning fuel rods within individual cells of all the fuel spacers in the fuel bundle.

Another example embodiment is directed to a system of a reactor plant for removing bow and twist within a nuclear fuel bundle to permit inspection and replacement of one or more fuel rods or water rods within the fuel bundle, where the fuel bundle has been removed from a reactor core to a spent fuel pool within the plant. The system includes a fuel prep machine (FPM) in the spent fuel pool for supporting the fuel bundle thereon, and a bundle alignment system attached to the fuel prep machine for aligning fuel rods within the fuel bundle to remove any bow or twist within the fuel bundle.

Another example embodiment is directed to a fuel rod alignment system for a fuel bundle residing in a spent fuel pool within the plant. The fuel bundle includes one or more water rods and a plurality of fuel rods including full-length rods and part-length rods extending vertically within the bundle through a plurality of axially spaced fuel spacers provided between a top end and a bottom end of the fuel bundle, each fuel spacer including a plurality of individual cells accommodating corresponding fuel rods and water rods. The system includes a fuel prep machine in the spent fuel pool for supporting the fuel bundle thereon, and a fuel rod guide block slidable onto the top end of the fuel bundle for protecting an uppermost fuel spacer of the fuel bundle and aligning fuel rods within individual cells of all the fuel spacers in the fuel bundle.

Another example embodiment is directed to a system for removing a part-length fuel rod from a fuel bundle, where the fuel bundle resides in a spent fuel pool of a nuclear reactor plant. The system includes a fuel prep machine in the spent fuel pool for supporting the fuel bundle thereon, and a rod grapple tool having a first end handled by an operator above the fuel pool in the plant and a second end inserted at a top end of the fuel bundle on the fuel prep machine to retrieve the part-length fuel rod within the bundle. The second end has a protective, removable guide pin which prevents the rod grapple tool from damaging the fuel bundle as the rod grapple tool is inserted into the bundle. The system includes a guide pin retrieval tool for, when the rod grapple tool has been inserted into the fuel bundle so that the guide pin and gripper are in position over the part-length fuel rod to be extracted, removing the guide pin to permit the gripper of the rod grapple tool to be attached to an upper end plug of the part-length fuel rod to extract the part-length fuel rod from the bundle.

BRIEF DESCRIPTION OF THE DRAWINGS

Example embodiments of the present invention will become more apparent by describing, in detail, example embodiments thereof with reference to the attached drawings, wherein like elements are represented by like reference numerals, which are given by way of illustration only and thus do not limit the example embodiments of the present invention.

FIG. 2A is a perspective view of a fuel prep machine (FPM) 110 for supporting an irradiated fuel bundle 150, showing the channel 20 removed in a spent fuel pool of a nuclear power plant.

FIG. 2B is a partial enlarged view of FIG. 2A to illustrate a carriage 120 of a fuel prep machine (FPM) 110 in further detail.

FIG. 2C is a perspective view of the fuel prep machine (FPM) 110 supporting the fuel bundle 150 thereon, with the channel 20 already removed.

FIG. 3A is a front view of a bundle alignment assembly 200 in accordance with an example embodiment.

FIG. 3B is a side view of FIG. 3A, the bundle alignment assembly 200.

FIG. 3C is an enlargement of detail A in FIG. 3B, detailing part of the bundle alignment assembly 200.

FIG. 4 is a partial side view of system 1000 in the vicinity of the lower rotating fixture 124 in order to show the connection of the bundle alignment assembly 200 to the fuel prep machine's (FPM) carriage 120.

FIGS. 5 and 6 are partial perspective views of the system 1000 to show the attachment of an upper mount block 208, and a lower mount attachment block 218 of the bundle alignment assembly 200 to the upper rotating fixture 122 of the carriage 120.

FIGS. 15A and 15B illustrate a fully extended lower position of the rod grapple tool 400.

FIG. 17A is a perspective view of a handling pole 502 attached to the rod guide pin retrieval tool 500.

FIG. 17B is an enlarged view of detail A in FIG. 17A showing the rod guide pin retrieval tool 500 lower portion in greater detail.

FIG. 18 illustrates different tongues 506 of various length configurations attachable to the end of the rod guide pin retrieval tool 500.

FIGS. 19-22 illustrate a process for removing the guide pin 435 from the rod grapple tool 400 within fuel bundle 150.

FIGS. 24A and 24B illustrates a conventional Boiling Water Reactor (BWR) fuel bundle 15 with its channel 20 removed, and with its channel 20 in place on the fuel bundle 150.

DETAILED DESCRIPTION OF EXAMPLE EMBODIMENTS

As will be described in more detail below, an example embodiment is directed to a system for aligning and handling selected fuel rods within a fuel bundle of a nuclear reactor which facilitates the ability of handlers to remove and install fuel rods without damaging the fuel spacers or adjacent fuel rods. The example system may provide a straight-line path to facilitate the extraction of fuel rods including part-length fuel rods without merely relying on the skill of the handler to insure that the fuel rod is removed without damaging adjacent fuel rods or fuel spacers. The example system may thus enable the fuel rods, spacers or spacer grids, water rods and end plugs to be protected during maintenance and/or inspection procedures within the spent fuel pool.

Figure 1:
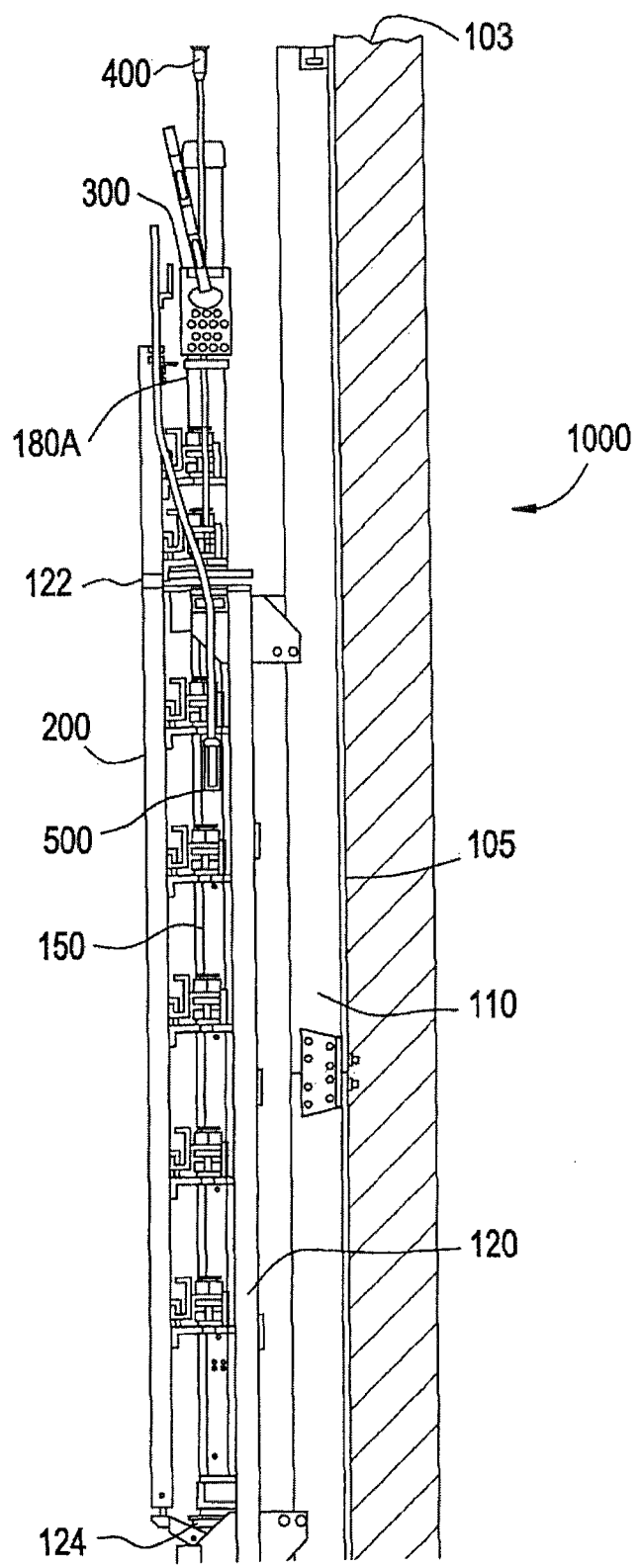
FIG. 1 is a side view of a system 1000 for aligning and handling selected fuel rods 155/160 and/or water rods 170 within a fuel bundle, in accordance with an example embodiment.

FIG. 1 is a side view of a system 1000 for aligning and handling selected fuel rods within a fuel bundle in accordance with an example embodiment. In FIG. 1, the fuel bundle 150 is supported by a fuel prep machine (FPM) 110. The FPM 110 is attached to a wall 105 of a spent fuel pool 103 within a nuclear reactor. The fuel bundle 150 is shown with its upper tie plate 30 and channel 20 removed, as this procedure is done once the fuel bundle 150 is lowered into the fuel prep machine 110. In this example, the fuel bundle 150 is for a BWR and has a 10×10 fuel rod matrix (10 rows by 10 columns of full-length and partial-length full rods), with a pair of centrally located circular water rods 170. However, fuel bundle 150 can have a configuration other than a 10×10 fuel rod matrix (9×9, 12×12, etc.), and a different number of water rods of different shapes and sizes, that may or may not be centrally located within the fuel bundle.

System 1000 includes a bundle alignment assembly 200 attachable to the fuel prep machine 110. The bundle alignment assembly 200 is provided for aligning fuel rods and water rods within the fuel bundle 150 to remove any twist or bow within the fuel bundle 150 and to provide a straight-line path for fuel rod installation and/or removal.

As will be seen in more detail below, the bundle alignment assembly 200 includes a series of alignment stations 210. Each alignment station 210 includes a plurality of rotatable pre-formed stainless steel blades and rigid stainless steel blades. In general, the bundle alignment assembly 200 is lowered into position onto the fuel prep machine 110 and held in place by mechanical means. The fuel bundle 150 is then placed into the fuel prep machine (FPM) 110 for inspection. When manually actuating the bundle alignment assembly 200 by means of a handling pole, the rotatable pre-formed stainless steel blades and the rigid stainless steel blades are rotated together into the fuel bundle 150, creating a protective grid above each fuel spacer 180 while also capturing each individual fuel rod in the forward half of the nuclear fuel bundle 150.

One possible result of using the bundle alignment assembly 200 is to ensure that an in-service (i.e., irradiated) nuclear fuel bundle such as fuel bundle 150 has any twist and/or bow removed there from, a condition normally caused by the harsh environment within reactor vessels. The assembly 200 thus may provide a straight path for the removal and installation of individual fuel rods or water rods, while protecting the fuel spacers 180 from damage.

System 1000 further includes fuel rod guide block 300 slidable onto the top end of the fuel bundle 150 for protecting an uppermost spacer from damage, shown as spacer 180A in FIG. 1. The fuel rod guide block 300 protects the uppermost spacer 180A of the fuel bundle 150 from damage while inserting fuel rods by physically protecting the upper side of the spacer 180A. The fuel rod guide block 300 also enables aligning of fuel rods within individual cells of all the fuel spacers 180 in the fuel bundle 150.

Additionally, the fuel rod guide block 300 provides a lead-in to initially start a fuel rod into the fuel bundle 150 with desired proper alignment. Further, the rod guide block 300 provides an obvious visual indication as to where a fuel rod needs to be inserted into the fuel bundle 150. This can enable less experienced handlers to perform fuel rod removal and insert procedures without requiring the skill of and experience of the seasoned handler, since the fuel rod guide block 300 helps to properly align each of the fuel rods of the fuel bundle 150 in the vertical direction.

Figure 10:
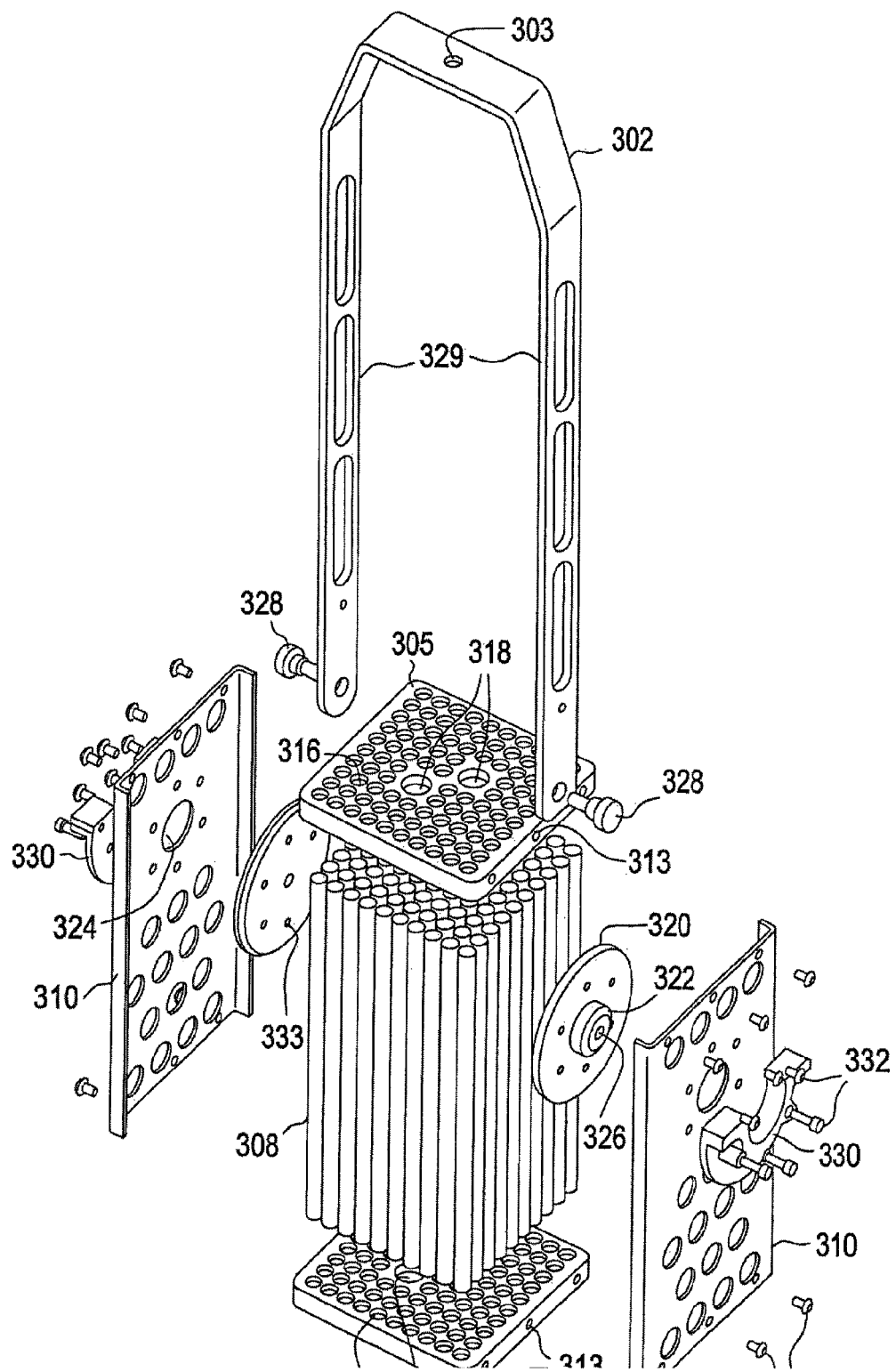
FIG. 10 is an exploded view of the fuel rod guide block 300 to illustrate constituent parts in more detail.

As will be shown in further detail hereafter in FIG. 10, the fuel rod guide block 300 includes two horizontally-oriented, spaced (upper and lower) stainless steel plates separated by a plurality of vertically-arranged stainless steel tubes. Each of the plates has a plurality of openings which align with the locations of the fuel rods and water rods within the bundle 150. The fuel rod guide block 300 is held together by two vertically-oriented side plates attached by suitable fasteners to each of the upper and lower plate. A bail (handle) with restricted movement is attached to the fuel rod guide block 300 for the purpose of lowering it onto the fuel bundle 150 that is supported on the FPM 110, prior to in-service fuel inspections.

Thus, the fuel rod guide block 300 is designed to slide onto the top of the nuclear fuel bundle 150 positioned in the FPM 110. As will be described in further detail below (FIGS. 11A and 11B), once installed, the fuel rod guide block 300 is limited to its downward travel into bundle 150 by creating a restricted fit between the water rods and tapered central openings in the upper plate of the fuel rod guide block 300 which are aligned with the water rods. The fuel rod guide block 300 comes to rest onto tapered sections of a water rod transition area.

Although system 1000 is shown with both the bundle alignment assembly 200 and rod guide block 300 included, each can be used independently without the other for inspection and/or maintenance of an irradiated fuel bundle 150. In an example, fuel bundle 150 can be an irradiated fuel bundle that has been removed from the BWR core, a previously used bundle 150 that is stored within the spent fuel pool of the plant, a new fuel bundle 150 that has been stored within the spent fuel pool of the plant while awaiting placement within the reactor's core as a reload, a fuel bundle having been removed from an on-site new fuel storage fault for placement in the fuel pool, and/or a fuel bundle from a fixed or movable dry storage cask for placement into the fuel pool).

In another example embodiment, the FPM 110 and only bundle alignment assembly 200 are used together for supporting a fuel bundle 150 and aligning the fuel rods and water rods of the bundle for inspection and/or rod replacement purposes. For any irradiated bundle 150 exhibiting twist and or bow, the FPM 110 and bundle alignment assembly 200 may thus constitute a system for removing the twist/bow within a fuel bundle to permit inspection and possible replacement of one or more fuel rods or water rods therein within the spent fuel pool of the plant. In this alternative embodiment, the rod guide block 300 may not necessarily be installed.

In the event that an irradiated fuel bundle 150 exhibits no twist or bow, the bundle alignment assembly 200 does not need to be installed, only the rod guide block 300 is installed on the top of the bundle 150 above the uppermost spacer 180A. In this alternative embodiment, the rod guide block 300 with FPM 110 can represent a separate fuel bundle handling system, in which the FPM 110 supports fuel bundle 150 thereon and the rod guide block 300, when installed on the top end of the bundle 150, aligns each of the fuel rods 155 and water rods 170 of the fuel bundle 150 in the vertical direction.

Referring again to FIG. 1, the system 1000 also includes a rod grapple tool 400. In particular, rod grapple tool 400 is utilized by a handler for the removal of fuel rods, such as certain tie rods and/or the shorter part-length fuel rods which are deeper within the fuel bundle 150. A different, pre-existing rod grapple tool may be used for the removal and/or reinsertion of standard full length fuel rods and certain tie rods, as the upper end plugs of the standard full length fuel rods and tie rods may be designed differently than that of the upper end plug of the part-length fuel rod. The rod grapple tool 400 is designed so as to mimic the dimensions of individual fuel rods. This allows the rod grapple tool 400 to safely pass through the fuel spacers 180 without causing component damage.

As will be seen in more detail below (FIG. 15B, for example), the rod grapple tool 400 includes a gripper (also referred to as a rod grapple) at the end of the tool 400 that is inserted into the fuel bundle 150 for extracting a part-length fuel rod. For insertion of the rod grapple tool 400 into the bundle 150, the rod grapple tool 400 includes a removable guide pin (shown in more detail in FIGS. 15A and 15B). The guide pin is inserted into the gripper and is generally tapered to a rounded pin end. Since the gripper has a blunt end, the guide pin is provided to prevent damage to the fuel spacers 180 as the rod grapple tool 400 is inserted into the fuel bundle 150.

Once the rod grapple tool 400 has been fitted with the guide pin, inserted into the fuel bundle 150 and positioned at a given axial location within the fuel bundle 150 above a part-length fuel rod to be extracted, a pin retrieval tool 500 is utilized to remove the guide pin from the end of the grapple tool 400. The pin retrieval tool 500 is shown in more detail hereafter and is attached at the end of a separate handling pole 502 for insertion down into the fuel pool to retrieve the guide pin from the rod grapple tool 400 end.

Accordingly, the rod grapple tool 400 and pin retrieval tool 500 may comprise a separate system for removing a part-length rod from a fuel bundle, independent of the bundle alignment assembly 200 and rod guide block 300 of the system shown in FIG. 1. Further, the rod guide block 300, rod grapple tool 400 and guide pin retrieval tool may comprise a separate system for removing part-length rods for the fuel bundle 150, independent of the bundle alignment assembly 200.

In general to remove a part-length rod from fuel bundle 150, the tapered, rounded guide pin is inserted in the end of the gripper so that only the tapered end of the guide pin extends from a lower housing of the rod grapple tool 400. The gripper is designed to be attached to an upper end plug of a part-length fuel rod for rod extraction. Once attached, the gripper is retracted into the lower housing so that the lower housing of tool mates with a shoulder of the end plug at the top of the part-length rod, providing a smooth continuous surface between the part-length rod and the attached rod grapple tool 400.

The guide pin thus creates a lead-in for the rod grapple tool 400 to pass through each fuel spacer 180. Once the rod grapple tool 400 is in position above a selected part-length fuel rod, the guide pin is removed using the pin retrieval tool 500 so that the gripper of tool 400 can be inserted over the partial length rod's end plug and engaged for fuel rod extraction.

As to be described in more detail below (FIGS. 17A and 17B), the pin retrieval tool 500 includes a tongue with a mating bore that receives a mating portion of the guide pin. The pin retrieval tool 500 is fixed to the end of the handling pole 502 to allow for remote handling of the guide pin within the fuel bundle 150. The pin retrieval tool 500 thus provides a positive means of capturing the guide pin 435 for repetitive use.

FIGS. 2A through 2C illustrate an example fuel prep machine 110 used in system 1000 in accordance with an example embodiment. Many nuclear power plants employ fuel prep machines 110 in the spent fuel pool of the plant to support an irradiated fuel bundle 150, thus a detailed explanation is omitted for purposes of clarity. As shown in FIGS. 2A to 2C, the fuel prep machine (FPM) 110 generally includes a stanchion 114 extending from an FPM platform 115 down into the spent fuel pool of the plant. The FPM 110 includes a carriage 120 which slides up and down as needed on rails 116 formed on the stanchion 114. The carriage 120 includes an upper rotating fixture 122 and a lower rotating fixture 124 which permit rotational movement of the fuel bundle 150 therein.

The FPM 110 is a permanent fixture in the spent fuel pool 103 and is mounted on one of the walls 105 of the spent fuel pool 103, as is known. The FPM platform 115 is the only portion of the FPM 110 that is above water and includes a safety handrail 117. A fuel bundle (such as bundle 150) is delivered to the FPM 110 via a fuel handling bridge (not shown, this is a permanent fixture in a reactor plant). Once in place over the carriage 120, the carriage 120 is raised to receive the fuel bundle 150. The fuel bundle 150 may be rotated in either direction up to 360 degrees as desired for inspection and/or maintenance purposes via upper and lower rotating fixtures 122, 124.

FIG. 3A is a front view of the bundle alignment assembly 200 and FIG. 3B is a side view of assembly 200. FIG. 3C is an enlargement of detail A in FIG. 3B. Referring to FIGS. 3A and 3B, assembly 200 includes a plurality of axially-spaced alignment stations 210 mounted to a mounting frame 205 which is attached to the upper and lower rotating fixtures 122, 124 of the fuel prep carriage 120 on the FPM 110 as will be shown hereafter. The assembly 200 includes a bail 202 which enables it to be lowered onto and removed from the FPM 110. Each alignment station 210 includes a support plate 206 with a plurality of alignment blade bundles 220 mounted thereon. As best shown in FIG. 3C, the support plate 206 is mounted to a cross member 204 affixed to the mounting frame 205 and also to the mounting frame 205 by mechanical fastening means 214 (such as nut-screw-washer assemblies). Each alignment station 210 includes a plurality of alignment blade bundles 220 mounted thereon. In FIG. 3A, these are shown as blade bundles 220A, 220B and 220C.

As will be seen in further detail below, the alignment blades of these bundles are rotated to align fuel rods and water rods in the front half of the fuel bundle 150 (due to clearance constraints of the FPM 110, half the bundle 150 is aligned at a time for inspection and/or rod removal/installation in that half), then the bundle 150 is rotated to inspect and/or service the other half of the same bundle.

Figure 5:
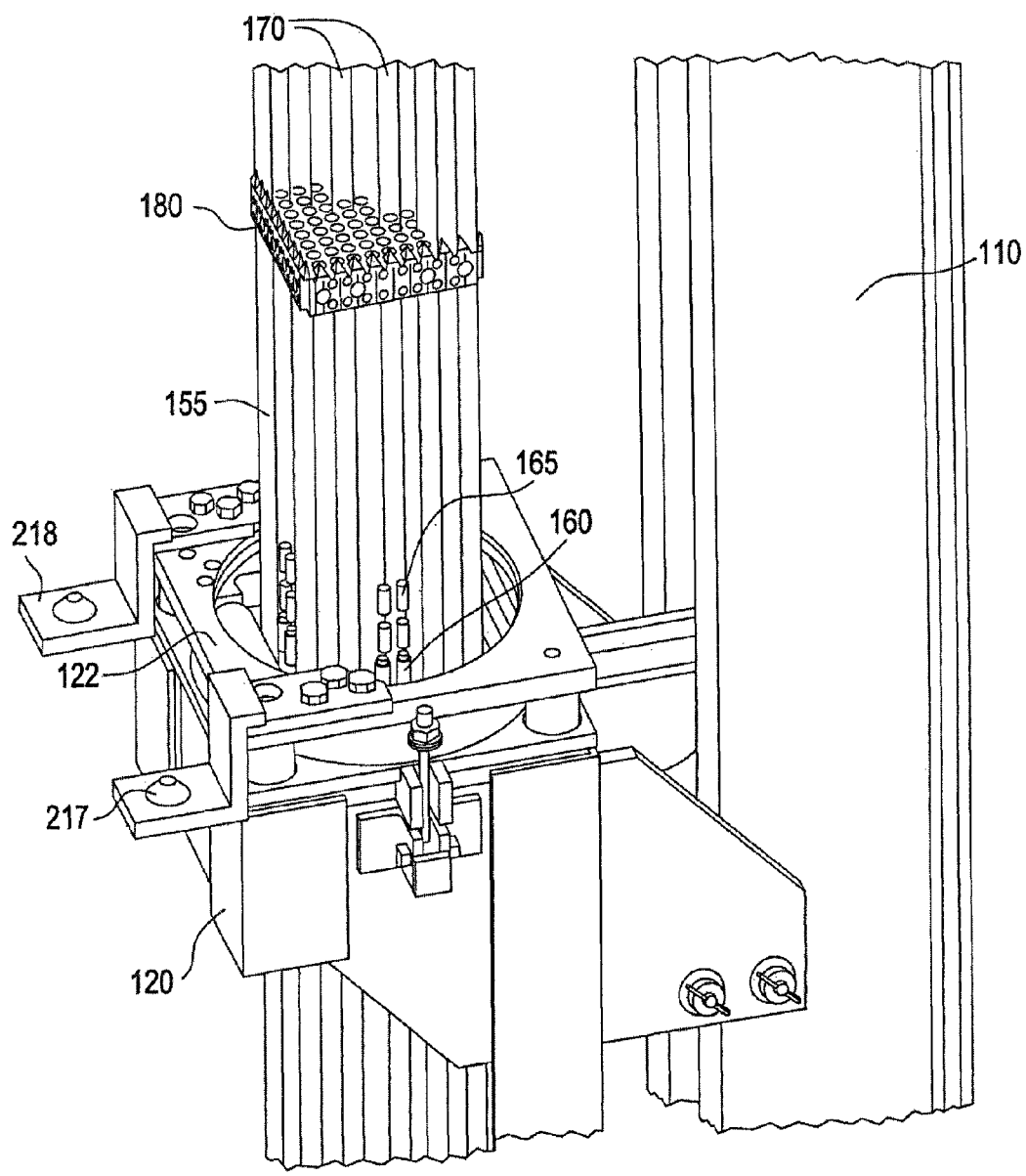

FIG. 4 is a partial side view of system 1000 in the vicinity of the lower rotating fixture 124 in order to show the connection of the bundle alignment assembly 200 to the fuel prep machine 110; FIGS. 5 and 6 are partial perspective views of the system 1000 to show the attachment of the upper mount block 208 to the upper rotating fixture 122.

Referring to FIGS. 4-6, in order to mount the bundle alignment assembly 200, an upper mounting bracket 218 and a lower mounting 216 are installed on the upper and lower rotating fixtures 122 and 124. These will capture the mating surfaces of the bundle alignment assembly 200. As shown best in FIG. 4, a lower mounting bracket 216 is attached to the lower rotating fixture 124. The lower mounting bracket 216 is configured to receive an alignment pin 212 which is connected to the bottom of the mounting frame 205 of the bundle alignment assembly 200.

The upper mounting bracket 218 is attached to the upper rotating fixture 122. Each upper mounting bracket 218 includes a feature which has a threaded cavity 217 therein. The brackets 218 are adapted to receive spring loaded pins 219 which screw therein to connect the upper mount blocks 208 at the upper end of the bundle alignment assembly 200 to the upper mounting brackets 218 of the upper rotating fixture 122. As best shown in FIG. 6, this secures the bundle alignment assembly 200 to the carriage 120 of the fuel prep machine 110, with the spring loaded pins 219 inserted into the threaded cavities 217 of the upper mounting brackets 218.

Of note, FIG. 5 provides a clearer view of the internal arrangement of fuel rods, comprising full-length fuel rods 155 and part-length fuel rods 160, and water rods 170 within fuel bundle 150. For purposes of clarity, a number of full and part-length rods 155, 160 have been removed so that the water rods 170 and other part-length rods 160 can be seen. Also illustrated are the upper end plugs 165 on the part-length fuel rods 160. Further, the fuel spacer 180 with its individual cells may be seen in clearer detail.

Accordingly, the bundle alignment assembly 200 is lowered into position via its bail 202 so that the lower alignment pins 212 are guided into the lower mounting brackets 216. The upper mounting blocks 208 are then positioned onto the upper mounting brackets 218 and the spring loaded pins 219 are engaged in the upper mounting brackets 218 to secure the bundle alignment assembly 200 into place.

Figures 7A, 7B:
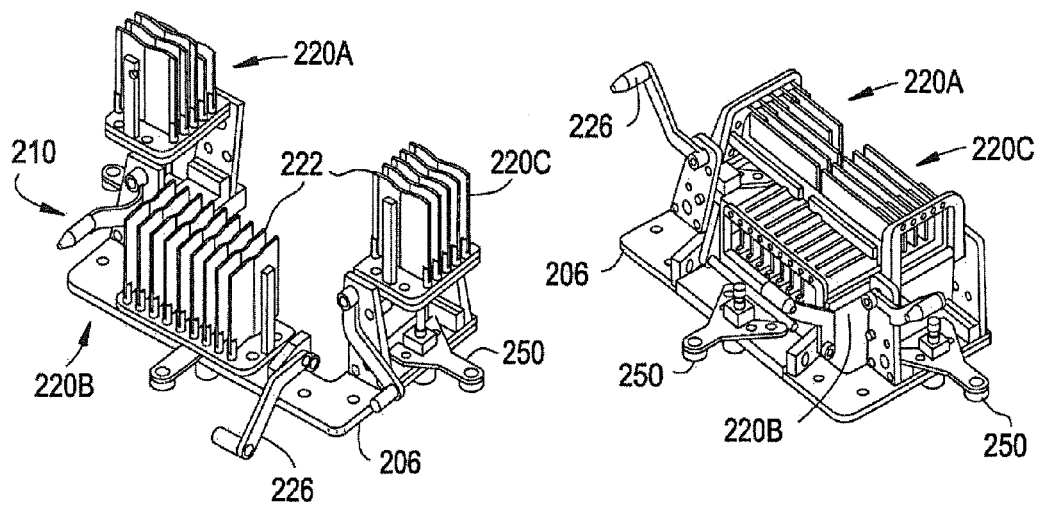
FIG. 7A is a perspective view of an alignment station 210 showing alignment blade bundles 220 in a neutral or disengaged position.
FIG. 7B is a perspective view of the alignment station 210 showing alignment blade bundles 220 in an engaged position.

FIG. 7A is a perspective view of an alignment station 210 showing alignment blade bundles 220 in a neutral or disengaged position. Each alignment station 210 includes a plurality of blade bundles 220. As shown in FIG. 7A (as well as in FIG. 3A), three (3) alignment blade bundles 220A, 220B and 220C are mounted on a generally C-shaped support plate 206. Each blade bundle 220 includes a plurality of stainless steel blades 222. However, blades 222 can be formed of other metals, metal alloys or materials having high thermal resistance properties and/or high coefficients of thermal conductivity, such as inconel, high temperature polymers (plastics) and ceramics.

Some of the individual blades 222 are shorter (shown as 222') than others in a given blade bundle 220 so as to create a grid 230 around a portion of the fuel bundle 220 (in this example, half of bundle 150) when the blade bundles 220 are rotated into an engaged position. In FIG. 7A, the individual blade bundles 220 are shown in a neutral or disengaged position. They are movable into an engaged position by corresponding activation handles 226.

FIG. 7B is a perspective view of the alignment station 210 showing the blade bundles 220 in an engaged position. As shown in FIG. 7B, the blade bundles 220A, 220B and 220C can be rotated into the fuel bundle 150 by actuating the activation handle 226. A hook used on the standard handling pole is used to actuate the activation handles 226 sequentially so as to first rotate the blade bundle 220B, then bundles 220A and 220C into the fuel bundle 150.

Figure 7C:
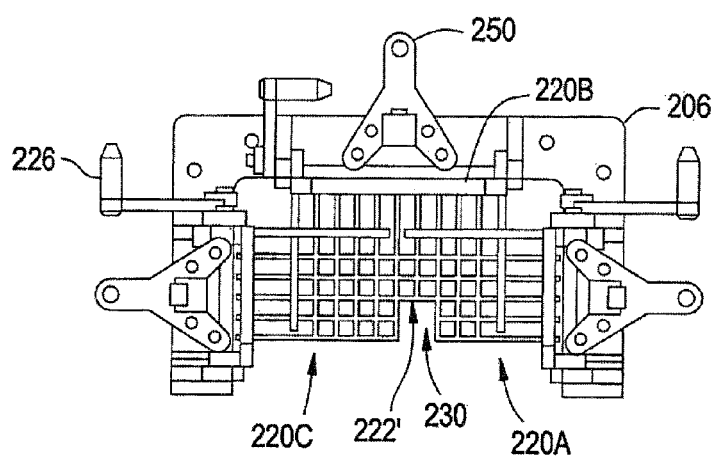
FIG. 7C is a top view of the alignment station 210 with the alignment blade bundles 220 in an engaged position to illustrate a grid 230 created for alignment of fuel rods 155, 160 and the water rods 170 within the fuel bundle 150.

FIG. 7C is a top view of the alignment station 210 with the blade bundles 220 in an engaged position to illustrate the grid 230 that is created for alignment of fuel rods 155/160 and water rods 170 within the fuel bundle 150. FIG. 7C also better illustrates the use of shorter blades 222' to form grid 230. Alignment blade bundle 220B is rotatable in a first plane, and the other two blade bundles 220A and 220 C are rotated in a second plane above blade bundle 220B so as to form the grid 230 around groups of fuel rods 155, 160 and water rods 170. The top view of FIG. 7C shows how the grid 230 is created with an interior center space to provide an opening for the water rods 170. This grid 230 in the example of FIG. 7C thus aligns approximately half the fuel rods 155/160 in fuel bundle 150, which for an example 10×10 fuel matrix are forty-six (46) fuel rods and one (1) water rod. Half of the fuel rods 155/160 with one water rod 170 in bundle 150 are aligned at a time due to tolerance constraints of the FPM 110. The bundle 150 can simply be rotated within carriage 120 to permit rods 155/160/170 in the other half of the fuel bundle 150 to be aligned. Of note, the bundle 150 is straightened once the blade bundles 220A-C are inserted from one side. Selected fuel rods 155, 160 on the other side of the bundle 150 may still have bow or twist, but the overall bundle 150 profile will be straight in the axial direction.

For each alignment station 210, the protective grid 230 formed by the alignment blade bundles 220 vertically aligns the fuel rods 155/160 and water rods 170 above each of the fuel spacers 180 in the bundle 150, as shown in FIG. 1 for example. Of course, alignment stations 210 can be located below the spacers 180 so that the grid 230 formed by blade bundles 220 vertically aligns the fuel rods 155/160 and water rods 170 below each of the fuel spacers 180. If desired, alignment stations 210 can be attached just above and below spacers 180 to form the grids 230 that align the fuel rods 155/160 and water rods 170 above and below each of the fuel spacers 180 in the bundle 150.

In an alternative construction, the blade bundles 220 can be rotated horizontally to an engaged position such that individual blades 222 rotate independent of one another. In this embodiment, selected blades 222 may be removed from selected blade bundles 220 to align a particular portion of fuel rods 155/160 in the bundle 150. Different combinations of blades 222 in each of the blade bundles 220 of an alignment station 210 can thus be rotatable to align one or more of a half-section of the bundle 150, a quarter-section of the bundle 150 and an eighth section of the bundle 150, for example.

It would be evident to one skilled in the art to include additional blades 222 with varying or different lengths to accommodate different fuel rod matrix configurations other than 10×10, such as fuel bundles having 9×9 fuel rod matrices or larger fuel bundles such as the developing 17×17 fuel rod groups for pressurized water reactors (PWRs).

Figure 8A:
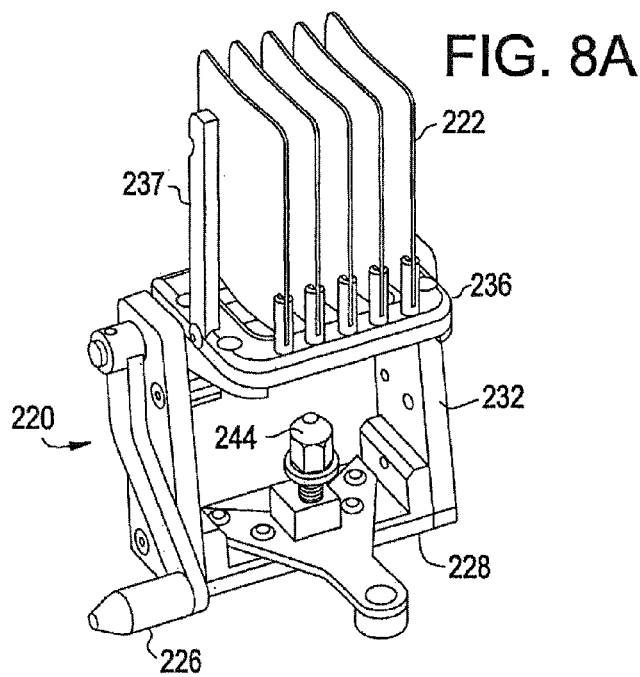
FIG. 8A is a perspective view of the alignment blade bundle 220 in accordance with an example embodiment.
Figure 8B:
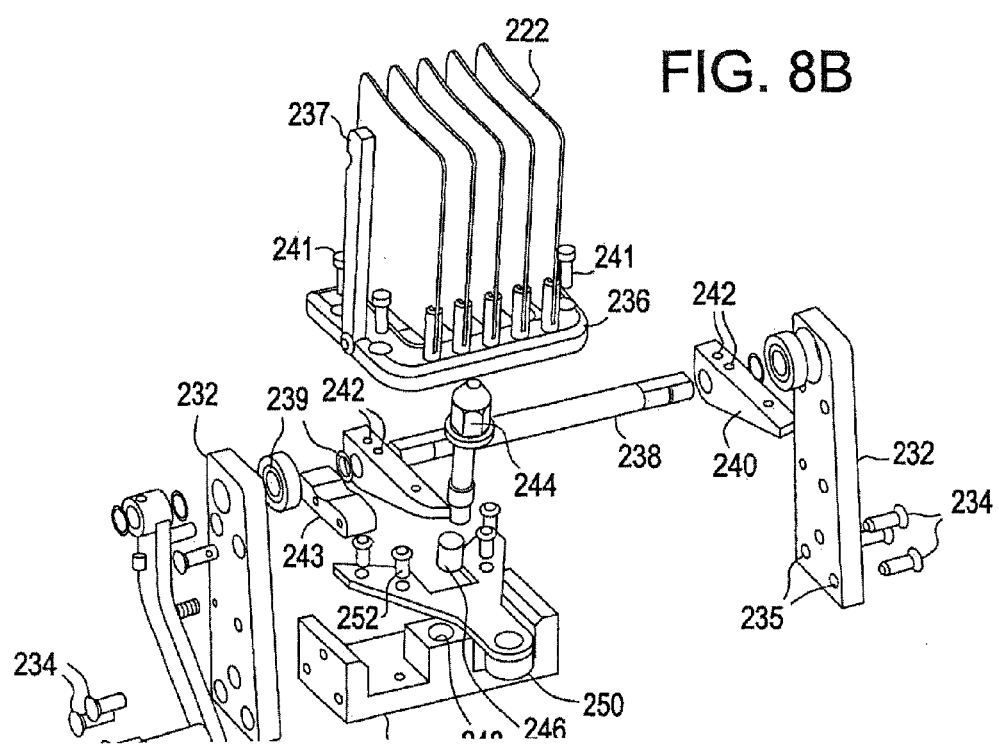
FIG. 8B is an exploded view of FIG. 8A illustrating the constituent parts of the alignment blade bundle 220.

FIG. 8A is a perspective view of an alignment blade bundle 220 and FIG. 8B is an exploded view of FIG. 8A illustrating the constituent parts of the alignment blade bundle 220. Referring to FIGS. 8A and 8B, an alignment blade bundle 220 (each of the three alignment blade bundles have similar parts) includes a base plate 228 which has two side plates 232 connected thereto via a plurality of fasteners 234 such as the screws which are secured within threaded bores 235. The activation handle 226 is connected to one side of shaft 238 so as to be in rotational engagement with a shaft 238. The shaft 238 extends through a bearing/washer assembly shown generally at 239 and through a pair of pivot blocks 240.

The blades 222 are attached to a blade holder 236 which is affixed to the top of the pivot blocks 240 via a series of fasteners 241 received in corresponding threaded bores 242 in the pivot blocks 240. Each blade bundle 220 also includes a fixed stainless steel blade 237 attached to blade holder 236. The purpose of fixed blade 237 is to provide a rigid point to begin fuel rod alignment. A limit stop 243 is provided beneath the blade holder 236 so as to limit rotational travel of the blades 222 to no more than 90 degrees from vertical.

The blade bundle 220 is fixedly secured to the support plate 206 with a spring stop bolt 244 which compresses a spring 246 as it is tightened into a threaded bore 248 of the base plate 228. This allows a blade bundle 220 to be quickly removed from and/or reattached to support plate 206. An inspection tooling lug 250 is also attached to the base plate 228 via suitable fasteners 252 to permit an inspection tooling pole (not shown) to be attached thereon.

Figure 9:
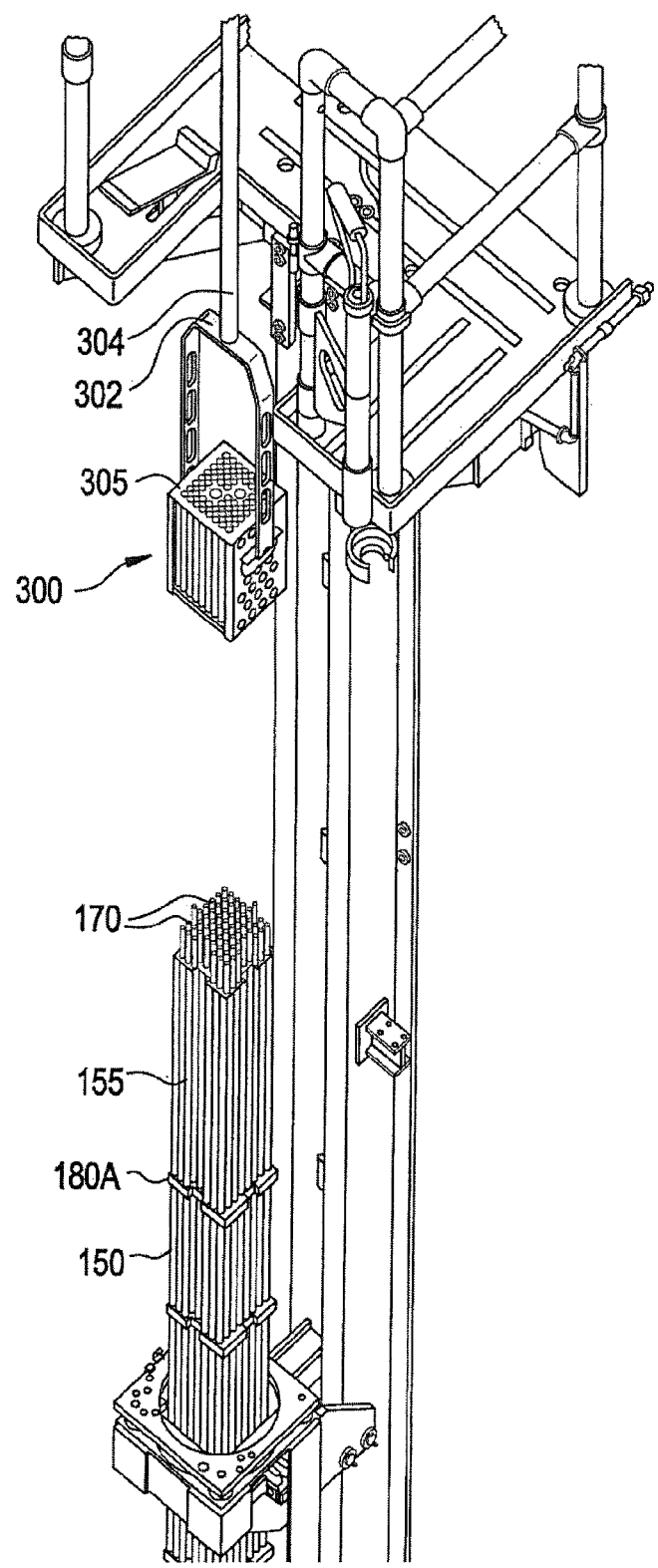
FIG. 9 is a partial perspective view of the system 1000 illustrating a rod guide block 300 lowered over a fuel bundle 150 in accordance with an example embodiment.

FIG. 9 is a partial perspective view of the system 1000 illustrating the rod guide block 300 placed over the fuel bundle 150. Referring to FIG. 9, the fuel rod guide block 300 has a bail 302 which is attached to a standard handling pole 304 to be lowered down into the spent fuel pool and place just below the upper end plugs of the full length fuel rods 155 and the tops of the water rods 170 at the top end of bundle 150. As previously indicated, in the event that the irradiated fuel bundle 150 exhibits no twist or bow, only the rod guide block 300 need to be installed on top of the bundle 150 above the uppermost spacer 180A.

The fuel rod guide block 300 when in place protects the uppermost spacer 180A from damage as fuel rods are inserted therein and also provides an aligned lead-in to initially start a replacement fuel rod (full-length fuel rod 155 or part-length rod 160) into the fuel bundle 150 with the desired proper alignment. Thus, the rod guide block 300 acts as both a shield (physically protecting spacer 180A) and a visual aid to show a handler where a fuel rod needs to be inserted into the fuel bundle 150 by providing a clear visual indication due to the structure and arrangement of an upper plate 305 of fuel rod guide block 300. Accordingly, less experienced handlers can perform fuel rod removal and insertion procedures without requiring the skill and experience of the seasoned handler, since the structure of the fuel rod guide block 300 helps to properly and perfectly align each of the fuel rods 155/160 of the fuel bundle 150 in the vertical direction.

FIG. 10 is an exploded view of the fuel rod guide block 300 to illustrate constituent parts in more detail. As previously described, the fuel rod guide block 300 is lowered onto the fuel bundle 150 via a standard handling pole 304. In an example, this can be a handling pole with a ½"-13 threaded stud that located on the lowest end of the pole 304, that's used to lower the guide block 300 over the fuel bundle 150. The threaded stud is received in the threaded bore 303 in bail 302 of the fuel rod guide block 300.

The fuel rod guide block 300 further includes an upper plate 305, a lower plate 306, and a plurality of stainless steel vertical tubes 308 dimensioned so as to be able to receive a replacement fuel rod 155, 160 or a rod grapple tool 400 there through. A pair of side plates 310 attach to the upper plate 305 and lower plate 306 so as to secure the tubes 308, upper plate 305 and lower plate 306 together. The side plates 310 include a plurality of holes 319 to facilitate decontamination and cleaning of tubes 308 within the guide block 300. As shown in FIG. 10, each of the upper plate 305 and the lower plate 306 have a plurality of threaded bores 313 which are configured to receive a plurality of fasteners 314 to attach the side plates 310 to the side surfaces of the upper and lower plates 305, 306.

As the example fuel bundle 150 has a 10×10 fuel rod matrix, 92 tubes 308 are employed (a space is provided in the center for the water rods 170), and each of the top and bottom plates 305 and 306 have 92 fuel rod openings 316 for fuel rods 155/160 or grapple tool 400 passage. Openings 316 align with the tubes 308 as shown. The upper plate 305 and lower plate 306 also include a pair of central openings 318 that align with the water rods 170 in the fuel bundle 150.

Accordingly, openings 316 and 318 mirror the locations of fuel rods 155/160 and water rods 170 in fuel bundle 150 and align with the tubes 308. Thus, as the fuel rod guide block 300 is positioned onto and/or over the fuel rods 155/160 and water rods 170 of the fuel bundle 150, the fuel rods 155/160 and water rods 170 are properly realigned, eliminating any bow and/or twist that might be present within the bundle 150 (such as in a case where the fuel rod guide block 300 is not used with bundle alignment assembly 200).

A bail attachment plate 320 is provided on either side of the tubes 308, between its corresponding side plate 310 and the tubes 308. Each bail attachment plate includes a projection 322 which extends through an opening 324 in its corresponding side plate 310. Each projection 322 has a centrally threaded bore 326 which is to receive a fastener 328 which secures each arm 329 of the bail 302 to its corresponding bail attachment plate 320, i.e., the fasteners 328 are captured by the threaded bores 326 to secure the bail 302 to the bail attachment plates 320.

A bail stop 330 is provided on each outside surface of each side plate 310, providing a restricted movement mechanism so as to prevent the bail 302 from traveling too far. As shown in FIG. 10, the bail stop 330 is secured to the side plate 310 and bail attachment plate 320 with a plurality of fasteners 332 which are captured in threaded bores 333 within the bail attachment plate 320.

Figure 11A:
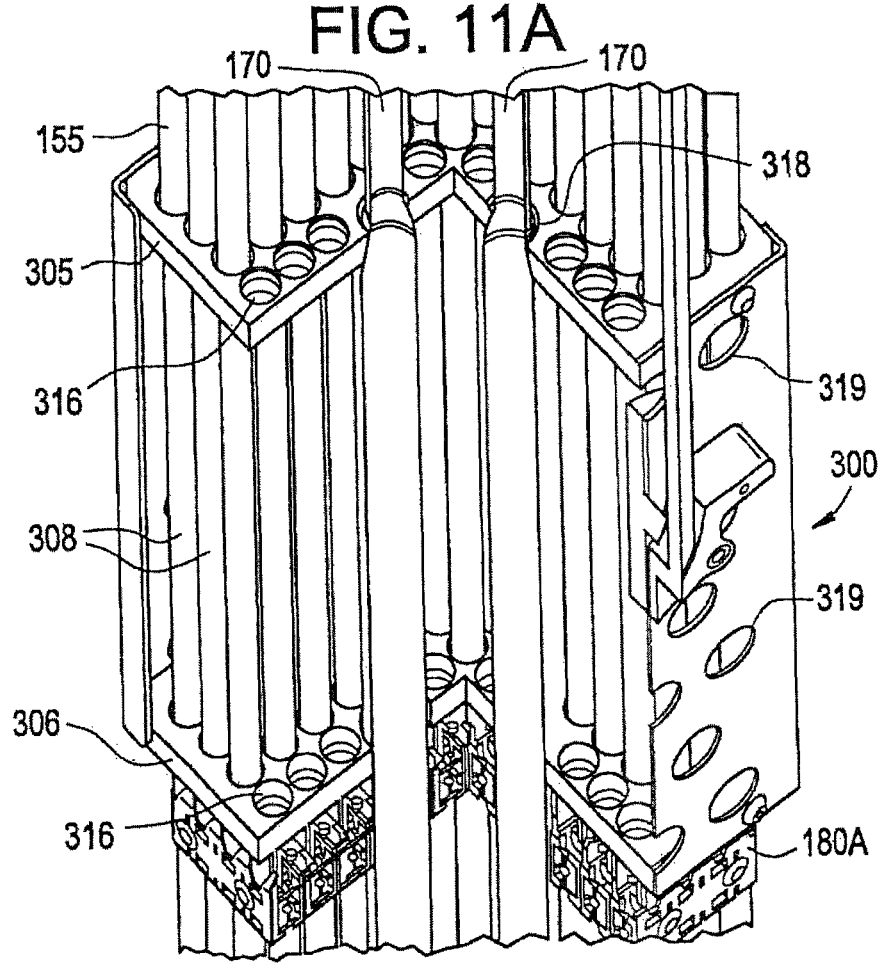
FIGS. 11A and 11B are partial cutaway views of the fuel rod guide block to illustrate the placement of the fuel rod guide block 300 within the fuel bundle and above the top of the uppermost space 180A.
Figure 11B:
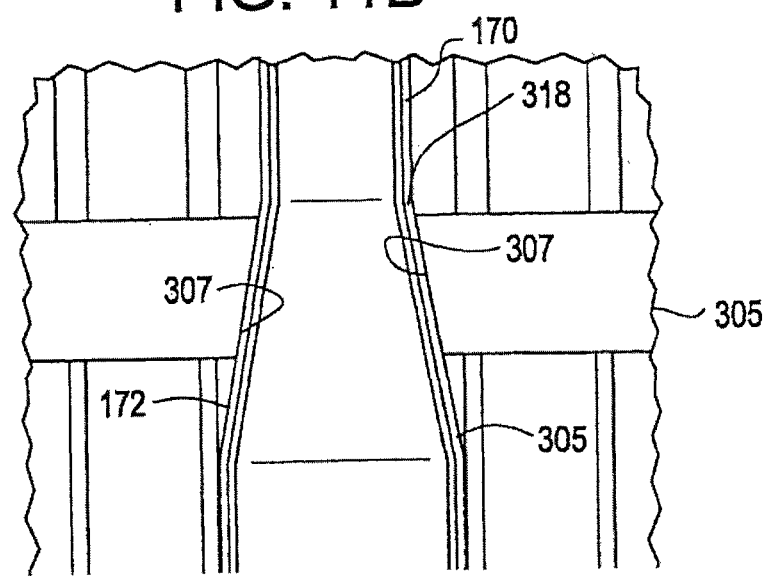

FIGS. 11A and 11B are partial cutaway views of the fuel rod guide block to illustrate the placement of the fuel rod guide block 300 over the fuel bundle 150 and on top of the uppermost space 180A. The fuel rod guide block 300 in FIGS. 11A and 11B is shown with an area where the tubes 308 have been removed to illustrate how the water rods 170 interact with the guide block 300. As the fuel rod guide block 300 is lowered by the handling pole 304, the fuel rods (full-length fuel rods 155 since this is the top of bundle 150) and water rods 170 extend through the apertures 316, 318 as the fuel rod guide block 300 is lowered down into the bundle 150. Downward travel of the fuel rod guide block 300 is terminated due to tapers 172 (neck-down features) of the water rods 170. The openings 318 in the upper plate 305 for the water rods are also tapered as best shown at 307 in FIG. 11B. Thus, when the tapered openings 318 meet the tapers 172 of the water rods 170, the fuel rod guide block 300 downward travel is halted. Accordingly the tapered surfaces 172, 307 prevent the fuel rod guide block 300 from traveling any further in the downward direction.

Figure 12:
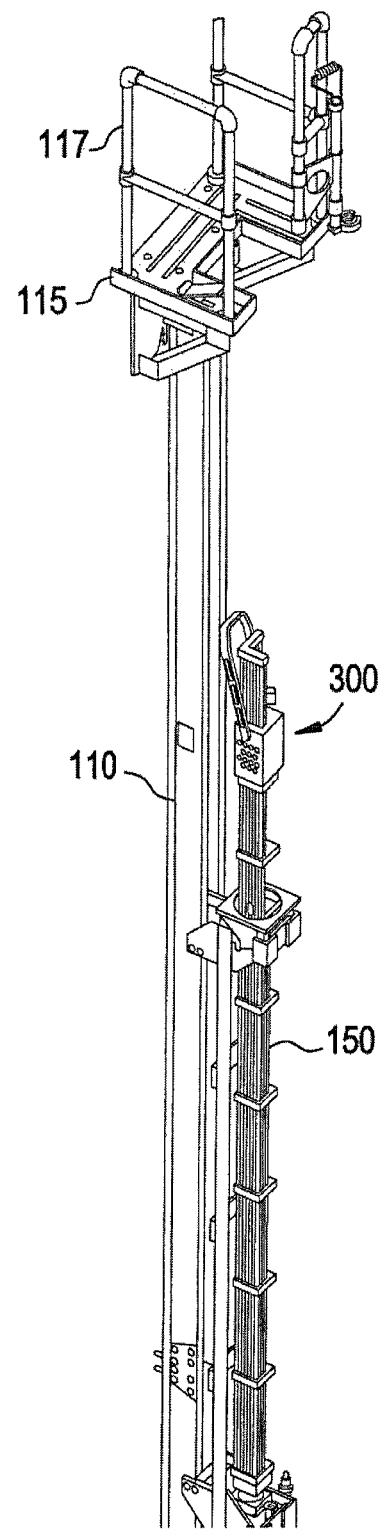
FIG. 12 illustrates a partial perspective view of the system 1000 with the fuel rod guide block 300 in place on the fuel bundle 150.
Figure 13:
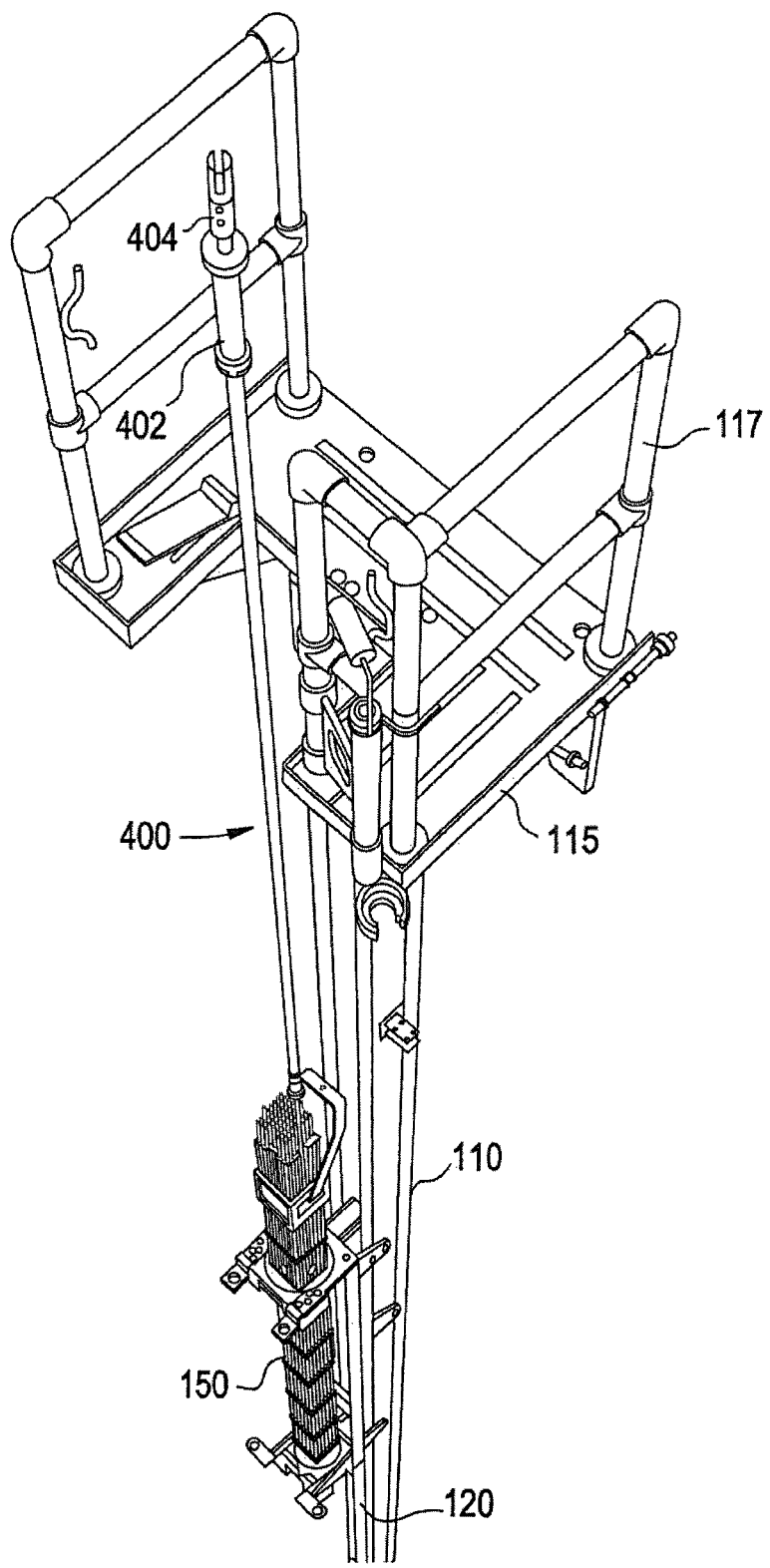
FIG. 13 illustrates a portion of a rod grapple tool 400 as being inserted into a fuel bundle 150, until it reaches a position just above the upper end plug 165 of a part-length rod 160.

FIG. 12 illustrates a partial perspective view of the system 1000 with the fuel rod guide block 300 in place on fuel bundle 150. Once the fuel rod guide block 300 is in position, the handling pole 304 is removed by rotating it counter clockwise to remove its stud from the threaded opening 303 in the bail 302. After the handling pole 304 is released from the fuel rod guide block 300, the handling pole 304 is used to tap the bail 302 either backwards or forwards. The handling pole 304 is then stored in its normal ready position hanging from the safety handrail 117 of the FPM platform 115, for example. FIG. 12 thus illustrates the system with the fuel rod guide block 300 in place.

FIGS. 13-16B describe the rod grapple tool 400 in further detail; reference should be made to these figures for the following discussion. The rod grapple tool 400 is shown generally in FIG. 13 from the vantage point of the FPM platform 115 looking down into the spent fuel pool below towards the fuel bundle 150, which is secured within the carriage 120 attached to the FPM 110. As previously noted, the fuel bundle 150 includes a plurality of part-length rods 160. The part-length fuel rods 160 may be different heights, known as upper part-length rods and lower part-length fuel rods. The rod grapple tool 400 is used to retrieve (or install) either the upper part-length fuel rods or the lower part-length rods 160 from the fuel bundle 150.

A handler grabs the rod grapple tool 400 by a handle 402 to lower the rod grapple tool 400 into the fuel bundle 150, such as through one of the tubes 308 in the fuel rod guide block 300. The rod grapple tool 400 includes a push-pull handle 404. In an optional variation, the push-pull handle 404 can include indicator markings (shown generally at 403) that indicates when the rod grapple tooling is in the fully extended position and/or when it is in the fully closed position, this part of the operation will be explained in further detail hereafter.

Figure 14A:
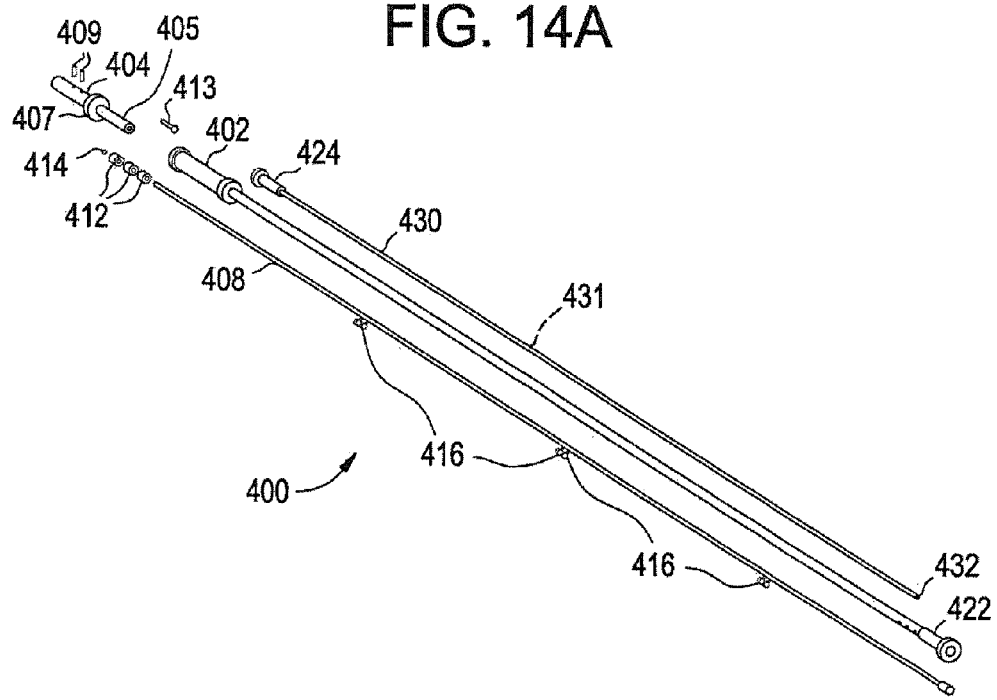
FIGS. 14A through 14D illustrate constituent parts of the rod grapple tool 400 in more detail.
Figure 14B:
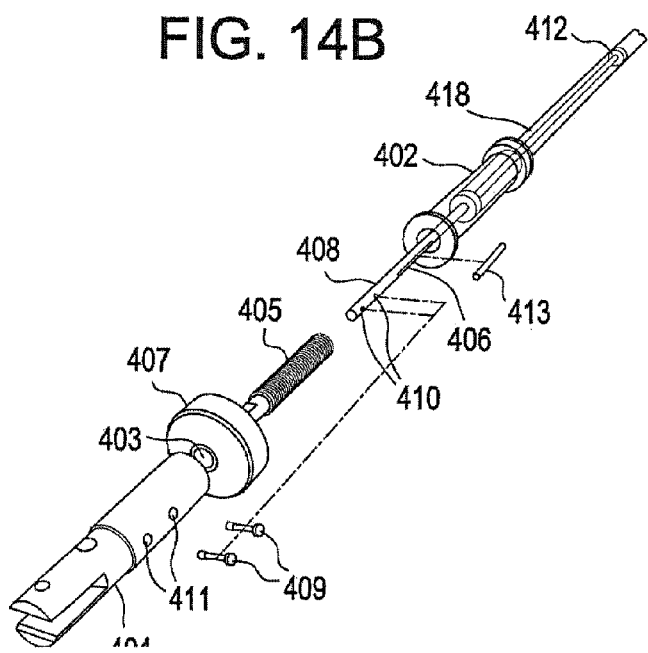

FIGS. 14A through 14D illustrate constituent parts of the part-length rod grapple tool 400 in more detail. As shown in FIGS. 14A and 14B, the part-length rod grapple tool 400 includes a push-pull handle 404 which is connected to an activation rod 408 via a plurality of fasteners 409 that are received in holes 411 in the push-pull handle 404 to be captured by threaded bores 410 in the activation rod 408. A top end of activation rod 408 is inserted up through a threaded sleeve 405 on which a threaded acme nut 407 rides, into the push-pull handle 404, where it is secured to the push-pull handle by fasteners 409 such as screws.

As shown in FIGS. 14A and 14B, the activation rod 408 is assembled with Delrin bushings 412, spiral retaining ring 414 and spaced retaining rings 416 which secure the Delrin bushings 412 along the activation rod 408. The Delrin bushings 412 keep the activation rod 408 centered in an upper housing 418. The upper housing 418 has the handle 402 at one end and a connector 422 at another end for attaching to a connector 424 of a lower housing 430 of the grapple rod tool 400. As the fasteners 409 are not strong enough to counter the potential rotational torque due to unscrewing the part-length rod 160 from its lower tie plate 40, a key stock 413 is provided in a slot 406 of activation rod 408 to absorb this torque.

As will be seen in further detail, the lower housing 430 contains an extendable gripper rod 431 (see dotted line to denote within the interior of lower housing 430 in FIG. 14A) which has a gripper 432 attached at a distal end thereon. The gripper rod 431 is attachable to the activation rod 408 within the connectors 422, 424 of upper and lower housings 418, 430, and can be extended via push-pull handle 404 to extend the attached gripper 432 outside of the lower housing 430 so as to retrieve a part-length rod 160.

Figure 14C:
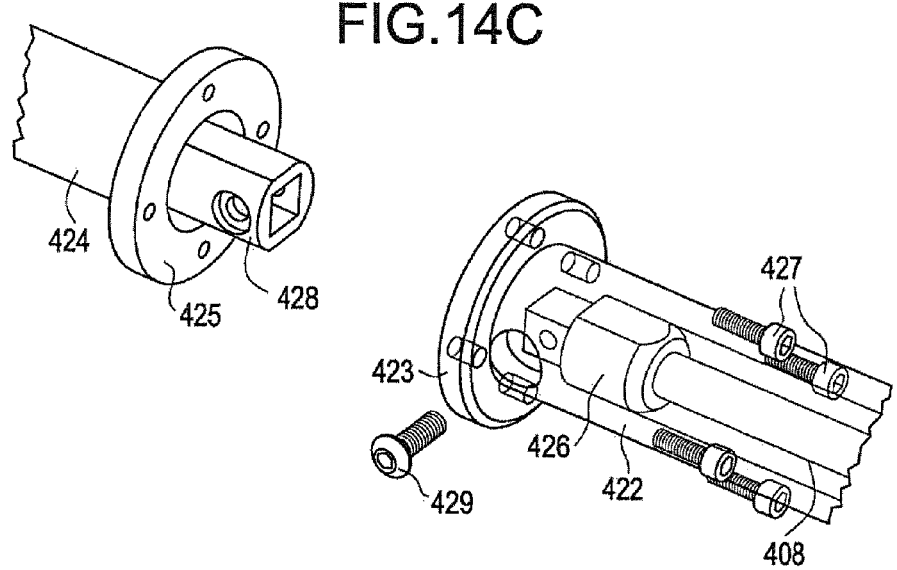
Figure 14D:
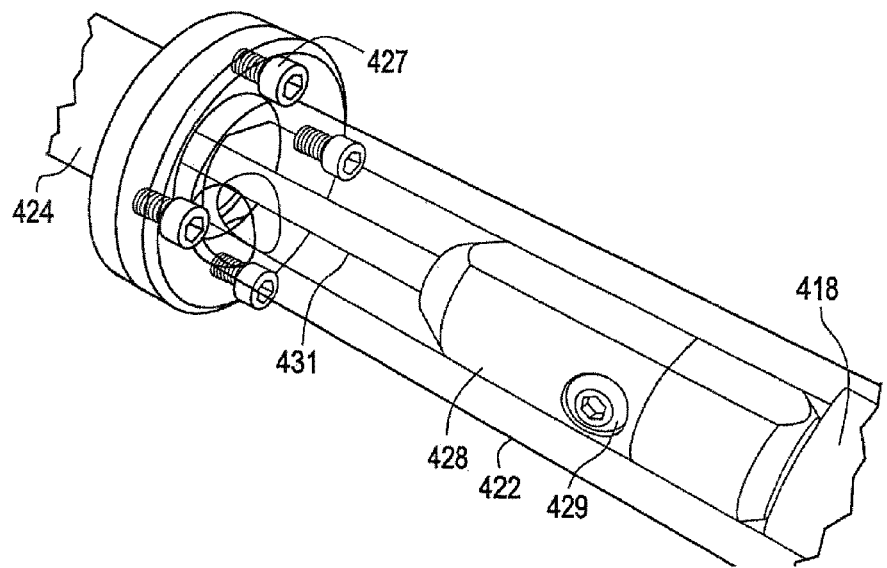

Referring to FIGS. 14C and 14D, the activation rod 408 has a machined flat end connector 426 which mates with a corresponding machine flat end connector 428 of the gripper rod 431 within the connector 424 of the lower housing 430. The machine flats on end connectors 426 and 428 keep the activation rod 408 and gripper rod 431 from rotating so as to allow the gripper 432 at the end of the gripper rod 431 to be pulled. The upper and lower housings 418 and 430 are joined at flat facing surfaces 423 and 425 by the use of suitable mechanical fasteners 427. Prior to connecting these housings 418 and 430 together, the activation rod 408 is connected to the gripper rod 431 via the end connectors 426 and 428, as best shown in FIG. 14D. In particular, a threaded screw 429 is captured through aligned bores in both end connectors 426 and 428 of their respective rods 408, 431.

The connection between activation rod 408 and gripper rod 431 allows the gripper 432 which is attached at the distal end of gripper rod to be extendable from the end of the lower housing 430, and hence retracted within lower housing 430. Accordingly, the rod grapple tool 400 has an extended position and a retractable or closed position.

FIGS. 15A and 15B illustrate the extended position of the rod grapple tool 400. The extended position is only used when loading or removing the guide pin 435 from gripper 432, as well as locking the gripper 432 of rod grapple tool 400 onto a partial-length rod 160 so as to extract it from the fuel bundle 150.

To extend gripper 432, while a handler holds the handle 402, the handler rotates the acme threaded nut 407 counterclockwise until it comes into contact with the push-pull handle 404. This causes the gripper 432 at the end of gripper rod 431 to be extended out from the end of lower housing 430.

As shown best in FIG. 15B, the protective guide pin 435 is inserted into the gripper 432. The guide pin 435 has a tapered, generally rounded end 437 and includes a mating portion 436 thereon to be captured by the guide pin retrieval tool 500 for removing the guide pin 435 from the gripper 432. Once the rod grapple tool 400 is returned to its retracted position, the protective guide pin 435 remains in place and abuts the edge of lower housing 430 so as to create a flush, smooth surface 450. The rod grapple tool 400 is then inserted down through the fuel bundle 150 and spacers 180 to a position above a part-length rod 160 to be extracted.

Figure 16A:
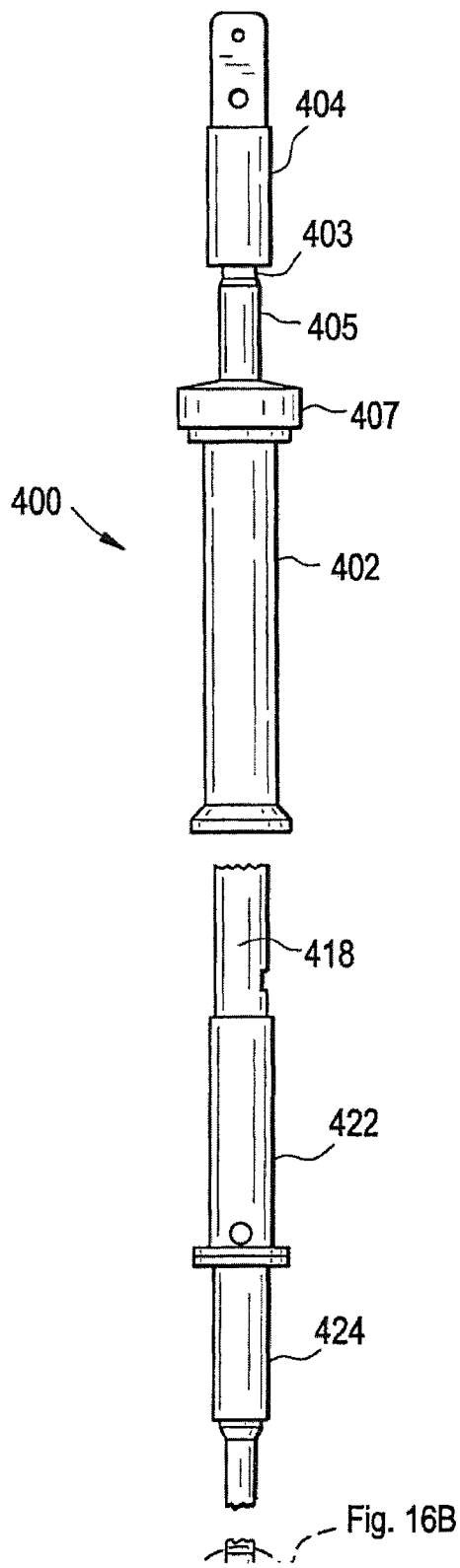
FIGS. 16A and 16B illustrate a fully closed position of the rod grapple tool 400.
Figure 16B:
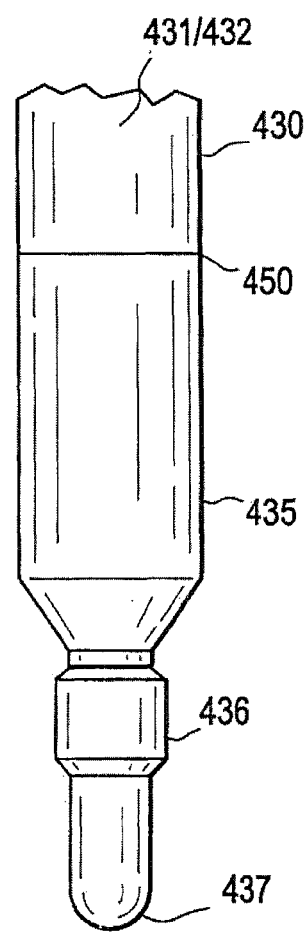

FIGS. 16A and 16B illustrate the closed position of the rod grapple tool 400. Here the guide pin 435 is shown installed as having a flush surface 450 with the end of the lower housing 430, with the gripper rod 431 and its gripper 432 retracted therein. This is the position for insertion of the rod grapple tube 400 down through the fuel rod guide block 300 into the bundle 150. The blunt end 433 of the gripper 432 is thus not exposed. While holding the handle 402, the threaded nut 407 is rotated clockwise. This will draw the gripper 432 up into the lower housing 430 such that the guide pin 435 mates flush with the lower housing 430 at surface 450.

FIGS. 17A-22 illustrate the structure and function of the guide pin retrieval tool 500 in further detail. Once the rod grapple tool 400 is in position within the bundle 150 between a spacer 180 and a part-length rod 160, which is to be extracted, the guide pin 435 needs to be removed from the rod grapple tool 400. This is accomplished with the pin retrieval tool 500.

FIG. 17A is a perspective view of guide pin retrieval tool 500, and FIG. 17B is an enlarged view of detail A in FIG. 17A. The pin retrieval tool 500 is positioned between the top of the part-length rod to be extracted and the fuel spacer 180 above the part-length rod 160. The pin retrieval tool 500 is attached to a handling pole 502, only a portion of which is shown in FIG. 17A. The lower portion of the handling tool 502 may be bent as shown to account for limitations in the access of open space of fuel prep machine 110. The pin retrieval tool 500 is attached at the end of the handling pole 502 and includes a horizontal extension 504 to which is attached a tongue 506.

Figure 21:
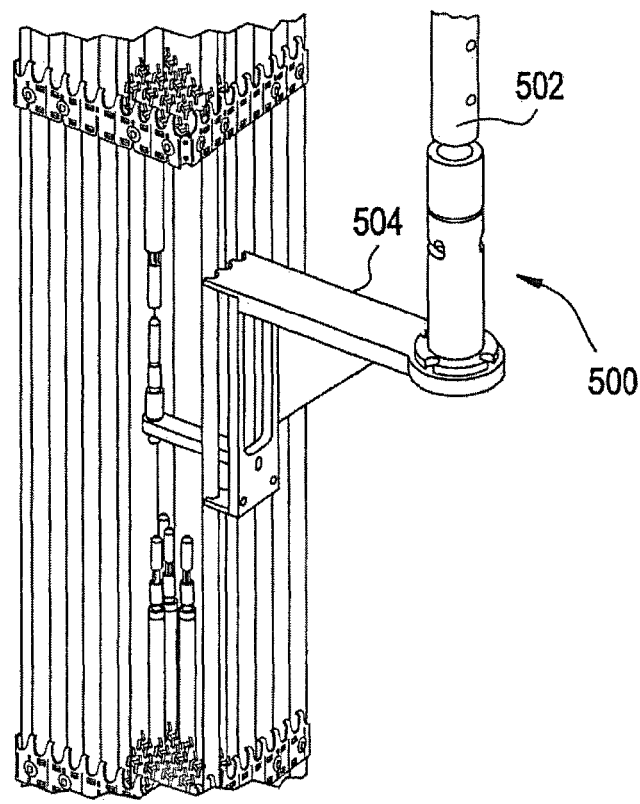
Figure 22:
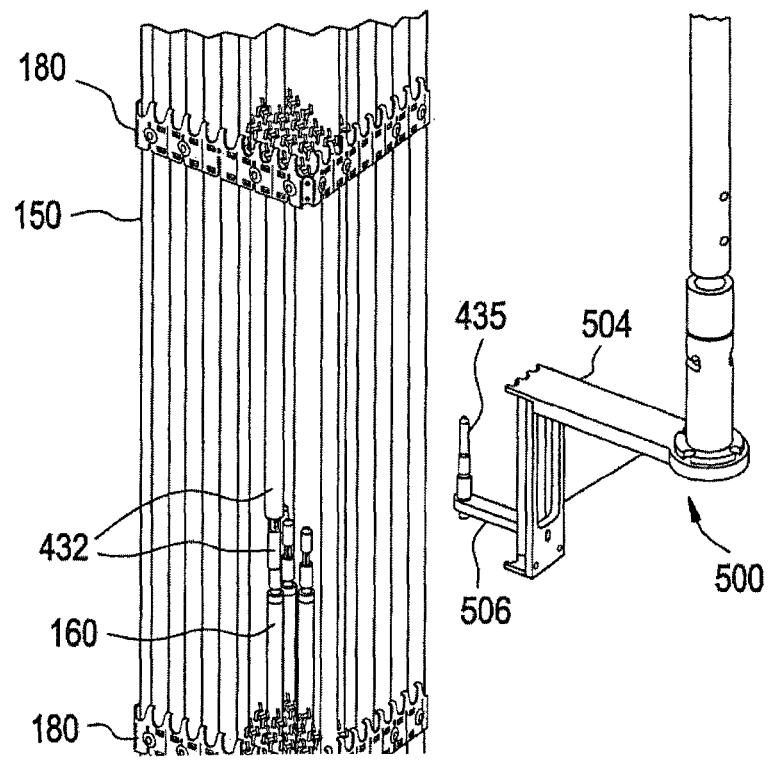

As shown in the enlarged view of detail A in FIG. 17B, the tongue 506 includes a mating aperture 508 for capturing the mating portion 436 of the guide pin 435, as best shown in FIG. 20, 21 or 22. Accordingly, the tongue 506 is placed under the tapered end 437 of the guide pin 435 so that the mating aperture 508 engages with the mating portion 436 on guide pin 435. In an alternate example each of the mating aperture 508 and mating portion 436 can include threads thereon for engagement.

The pin retrieval tool 500 also includes a pair of semicircular, serrated edges 510 and 512 which form a plurality of adjacent semicircular ridges that mate flush against the sides of adjacent full-length fuel rods 155 and/or part-length fuel rods 160 as the tongue 506 is inserted into the side of a fuel bundle 150. These serrated edges 510 and 512 help to maintain the pin retrieval tool 500 parallel with the side of the fuel bundle 150 being serviced. The serrated edges 510 and 512 thus help to maintain a proper alignment of the tongue 506 against the fuel bundle 150 so that the mating aperture 508 properly engages with the mating portion 436 on guide pin 435 and the tongue 506 without difficulty.

FIG. 18 illustrates different tongue 506 length configurations. The tongue 506 can be reconfigured for varying lengths to reach part-length fuel rods 160 which may require tunneling several rows into the fuel bundle 150, in order to reach the interior part-length rod 160 to be extracted. Three different examples lengths of tongue 506A, 506B and 506C are shown in FIG. 18, for example. The pin retrieval tool 500 may be configured with tongue 506A for removing part-length rod 160 from the outside row of fuel rods 155/160, with tongue 506B for part-length rods that are a few rows into the bundle 150 interior, and with tongue 506C to reach part-length fuel rods 160 at the very center of the fuel bundle 150, around the water rods 170, if found to be located within this area of the fuel bundle 150.

FIGS. 19-22 illustrate a process for removing the guide pin 435 from the rod grapple tool 400 within fuel bundle 150. Initially, the handling pole 502 lowers the pin retrieval tool 500 in the desired location within the bundle (FIG. 19), located just below the rod grapple tool 400 so that the tongue 506 is directly under the guide pin 435. The serrated edges 510 and 512 of the pin removal tool 500 abut flush to the sides of the fuel rods 155 and/or 160 of the fuel bundle 150 to ensure that the tongue 506 is properly oriented (level) so as to mate with the mating portion of the tongue's mating aperture 508 and mating portion 436 of the guide pin 435.

The rod grapple tool 400 is then lowered as shown in FIG. 20 so that the guide pin 435 is received into the mating aperture 508 of tongue 506, and then manipulated to engage the mating portion 436 of the guide pin 435 with the mating aperture 508 of the pin removal tool 500 so as to capture the guide pin 435. FIG. 21 illustrates the guide pin 435 fully captured by the pin retrieval tool 500. As shown in FIG. 22, the handling pole 502 is then moved away from the fuel bundle 150 and stored suspended from FPM platform 115 with the guide pin 435 thereon. Of note, if the guide pin 435 is needed again, it is retrieved from the pin retrieval tool 500 underwater by the rod grapple tool 400.

Figure 23A:
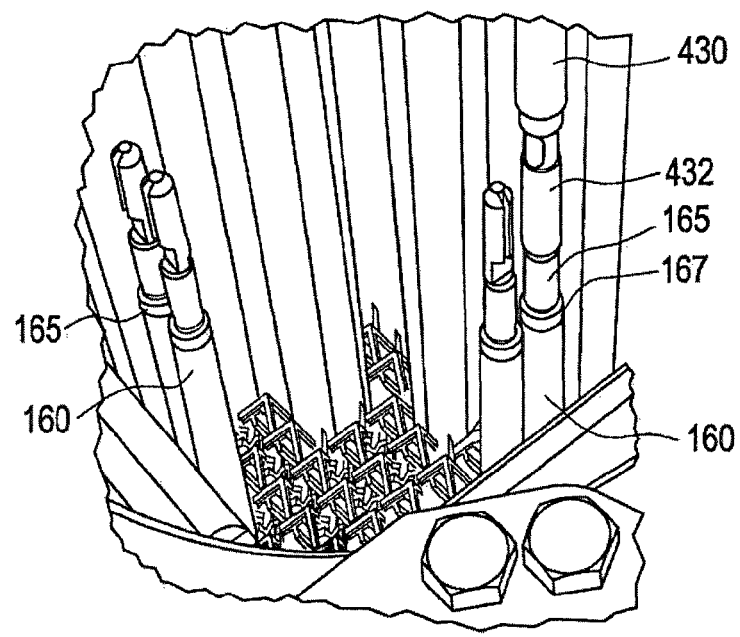
FIGS. 23A and 23B is illustrating the procedure for attaching the gripper 432 of rod grapple tool 400 to an upper end plug 165 of a part-length rod 160 within the fuel bundle 150.
Figure 23B:
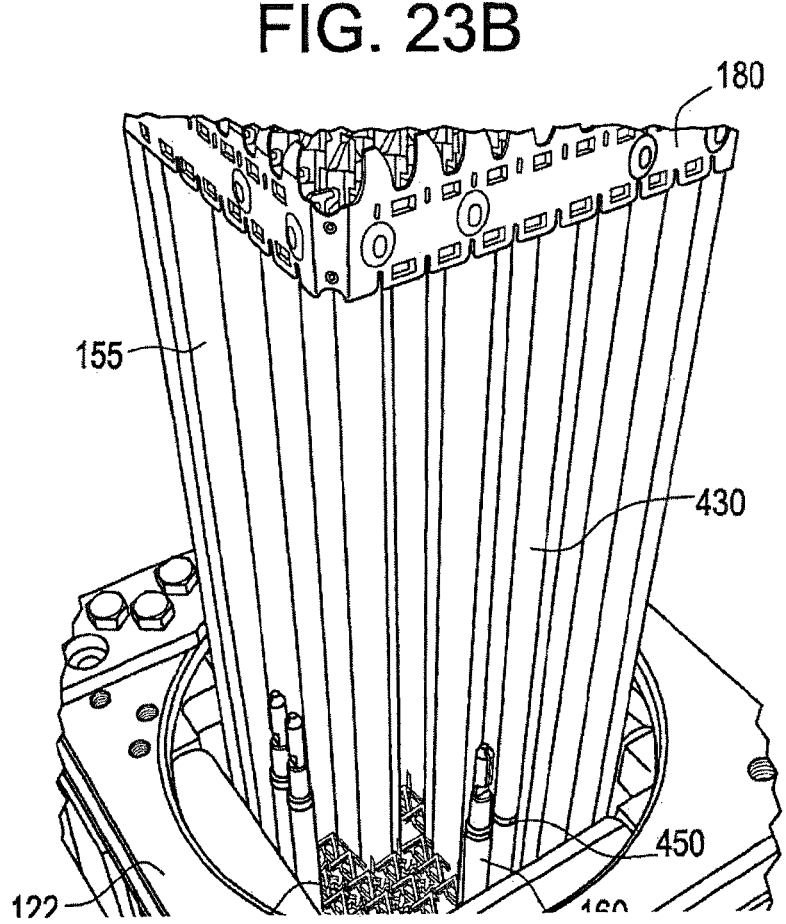

FIGS. 23A and 23B illustrate the procedure for attaching the gripper 432 of rod grapple tool 400 to an upper end plug 165 of a part-length rod 160. As previously described, the part-length rod grapple tool 400 must be placed in an extended position in order to remove the guide pin 435. This was shown previously in FIGS. 15A and 15B, in which the handler while holding the handle 402 rotates the threaded nut 407 counterclockwise until it comes into contact with the push-pull handle 404. This extends the gripper 432 with attached guide pin 435 from the end of the lower housing 430.

Accordingly, once the guide pin 435 has been removed by the pin retrieval tool 500, the gripper 432 in its extended position is placed over the upper end plug 165 of the part-length rod 160. This attaches the part-length rod 160 to the rod grapple tool 400. As shown in FIG. 23A, the part-length rod upper end plug shoulder 167 can damage the spacer 180 when removing the part-length rod 160. However, and as previously described with reference to FIG. 16A and 16B, rod grapple tool 400 is manipulated to its retracted position, which locks the part-length rod 160 and the rod grapple tool 400 together, making one long smooth tube for safe part-length rod 160 extraction. This flush connection is shown generally by surface 450 in FIG. 23B. Accordingly, potential damage due to exposed upper end plug shoulder 167 has been eliminated by the rod grapple tool 400. The part-length rod 160 can be removed without causing damage to any of the spacers 180.

The example embodiments of the present invention being thus described, it will be obvious that the same may be varied in many ways. For example, the rod grapple tool 400 has been described a being designed for a part-length rod 160, with another grapple tool used for the full-length rods 155 and/or tie rods due to a different upper end plug configuration. A different version (shorter in length) of this rod grapple tool 400 may be used for the removal and/or the replacement of tie rods and full length fuel rods 155 within the fuel bundle 150 For example, the full-length rods and tie rods can be configured to have the same upper end plug design as that of the part-length rods 160; thus a rod grapple tool having the same gripper 432 could be used for attachment to the upper end plugs of the full length fuel rods 155 and tie rods for removal from the fuel bundle 150. Such variations are not to be regarded as departure from the spirit and scope of the exemplary embodiments of the present invention, and all such modifications as would be obvious to one skilled in the art are intended to be included within the scope of the following claims.

What is claimed is:
1. A method of removing a part-length fuel rod from a fuel bundle, the fuel bundle residing in a spent fuel pool of a nuclear reactor plant, the method comprising:
providing a fuel prep machine in the spent fuel pool,
supporting the fuel bundle with the fuel prep machine,
providing a rod grapple tool with a gripper on the end of the rod grapple tool, attaching a protective, removable guide pin with a tapered, rounded-end tip portion to a distal end of the gripper, inserting the rod grapple tool into a top end of the fuel bundle, lowering the rod grapple tool down to a desired elevation of the fuel bundle above a top end of the part-length fuel rod within the fuel bundle, the guide pin preventing the rod grapple tool from damaging components of the fuel bundle as the rod grapple tool is inserted into the fuel bundle, providing a guide pin retrieval tool, lowering the guide pin retrieval tool along the side of the fuel bundle to the desired elevation, inserting a first portion of the guide pin retrieval tool into a side of the fuel bundle, mating the first portion of the guide pin retrieval tool with the guide pin, and removing the guide pin from the end of the rod grapple tool by securing the guide pin on the end of the guide pin retrieval tool.

2. The method of claim 1, further comprising:

mating a second portion of the guide pin retrieval tool against fuel rods on an outer side of the fuel bundle, the guide pin retrieval tool including, a handling pole, an extension element having a first end connected to the handling pole and two sets of vertically-shaped semicircular ridges at a second end of the extension element, the semicircular ridges being the second portion of the guide pin retrieval tool, and a tongue attached to the second end of the extension element, the tongue being the first portion of the guide pin retrieval tool, wherein the two sets of vertically-spaced semicircular ridges are configured to accomplish the mating of the guide pin retrieval tool against the fuel rods on the outer side of the fuel bundle.

3. The method of claim 2, wherein, the guide pin has a mating portion, the tip portion being on a distal end of the mating portion, the tongue having a mating aperture which fits over the tip portion of the guide pin to mate with the mating portion of the guide pin for releasing the guide pin from the rod grapple tool so as to expose the gripper.

4. The method of claim 2, wherein the two sets of vertically-spaced semicircular ridges maintain the guide pin retrieval tool parallel with the side of the fuel bundle.

5. The system of claim 3, wherein the two sets of vertically-spaced semicircular ridges maintain alignment of the tongue level with the fuel bundle to facilitate engagement of the mating aperture of the tongue with the mating portion of the guide pin.

6. The system of claim 2, wherein the tongue is located between the two sets of vertically-spaced semicircular ridges.

7. The system of claim 3, wherein the tongue is configured to have varying lengths to ensure that the tongue is capable of reaching varying depths within the fuel bundle.

8. The system of claim 1, the part-length fuel rod having an upper end plug, wherein the rod grapple tool is configured to provide a flush fit between the gripper and the guide pin, and between the gripper and the upper end plug of the part-length fuel rod.

* * * * *